US012705530B2

(12) United States Patent
Wimsatt et al.

(10) Patent No.: US 12,705,530 B2
(45) Date of Patent: Aug. 11, 2026

(54) OFF-DUTY-CYCLE-ROBUST MACHINE LEARNING FOR ANOMALY DETECTION IN ASSETS WITH RANDOM DOWN TIMES

(71) Applicant: ORACLE INTERNATIONAL CORPORATION, Redwood Shores, CA (US)

(72) Inventors: William A. Wimsatt, Kennebunk, ME (US); Matthew T. Gerdes, Oakland, CA (US); Kenny C. Gross, Escondido, CA (US); Guang C. Wang, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1229 days.

(21) Appl. No.: 17/382,593

(22) Filed: Jul. 22, 2021

(65) Prior Publication Data

US 2022/0261689 A1 Aug. 18, 2022

Related U.S. Application Data

(60) Provisional application No. 63/148,744, filed on Feb. 12, 2021.

(51) Int. Cl.
*G06N 20/00* (2019.01)
*G06N 5/04* (2023.01)

(52) U.S. Cl.
CPC ............... *G06N 20/00* (2019.01); *G06N 5/04* (2013.01); *G06F 2218/06* (2023.01); *G06F 2218/10* (2023.01); *G06F 2218/22* (2023.01)

(58) Field of Classification Search
None
See application file for complete search history.

(56) References Cited

U.S. PATENT DOCUMENTS 3,705,516 A 12/1972 Ries
4,686,655 A 8/1987 Hyatt
(Continued)

FOREIGN PATENT DOCUMENTS

CN 107181543 A1 9/2017
CN 110941020 A1 3/2020

OTHER PUBLICATIONS

Gross, Kenny, and Guang Chao Wang. "AI decision support prognostics for IOT asset health monitoring, failure prediction, time to failure." 2019 International Conference on Computational Science and Computational Intelligence (CSCI). IEEE, 2019. (Year: 2019).*
(Continued)

*Primary Examiner* — Raymond L Nimox
(74) *Attorney, Agent, or Firm* — Kraguljac Law Group LLC

(57) ABSTRACT

Systems, methods, and other embodiments associated with off-duty-cycle-robust machine learning for anomaly detection in assets with random downtimes are described. In one embodiment, a method includes inferring ranges of asset downtime from spikes in a numerical derivative of a time series signal for an asset; extracting an asset downtime signal from the time series signal based on the inferred ranges of asset downtime; determining that the asset downtime signal carries telemetry based on the variance of the asset downtime signal; training a first machine learning model for the asset downtime signal; detecting a first spike in the numerical derivative of the time signal that indicates a transition to asset downtime; and in response to detection of the first spike, monitoring the time series signal for anomalous activity with the trained first machine learning model.

20 Claims, 13 Drawing Sheets

(56) References Cited

U.S. PATENT DOCUMENTS 5,619,616 A 4/1997 Brady et al.
5,684,718 A 11/1997 Jenkins et al.
7,020,802 B2 3/2006 Gross et al.
7,191,096 B1 3/2007 Gross et al.
7,281,112 B1 10/2007 Gross et al.
7,292,659 B1 11/2007 Gross et al.
7,391,835 B1 6/2008 Gross et al.
7,542,995 B2 6/2009 Thampy et al.
7,573,952 B1 8/2009 Thampy et al.
7,613,576 B2 11/2009 Gross et al.
7,613,580 B2 11/2009 Gross et al.
7,702,485 B2 4/2010 Gross et al.
7,703,325 B2 4/2010 Wu
7,869,977 B2 1/2011 Lewis et al.
8,055,594 B2 11/2011 Dhanekula et al.
8,069,490 B2 11/2011 Gross et al.
8,150,655 B2 4/2012 Dhanekula et al.
8,200,991 B2 6/2012 Vaidyanathan et al.
8,214,682 B2 7/2012 Viadyanathan et al.
8,275,738 B2 9/2012 Gross et al.
8,341,759 B2 12/2012 Gross et al.
8,365,003 B2 1/2013 Gross et al.
8,452,586 B2 5/2013 Master et al.
8,457,913 B2 6/2013 Zwinger et al.
8,543,346 B2 9/2013 Gross et al.
8,983,677 B2 3/2015 Wright et al.
9,093,120 B2 7/2015 Bilobrov
9,514,213 B2 12/2016 Wood et al.
9,911,336 B2 3/2018 Schlechter et al.
9,933,338 B2 4/2018 Noda et al.
10,015,139 B2 7/2018 Gross et al.
10,149,169 B1 12/2018 Keller
10,452,510 B2 10/2019 Gross et al.
10,496,084 B2 12/2019 Li et al.
10,860,011 B2 12/2020 Gross et al.
10,929,776 B2 2/2021 Gross et al.
11,042,428 B2 6/2021 Gross et al.
11,055,396 B2 7/2021 Gross et al.
11,255,894 B2 2/2022 Wetherbee et al.
11,392,786 B2 7/2022 Gross et al.
2003/0033094 A1 2/2003 Huang
2003/0061008 A1 3/2003 Smith et al.
2007/0288242 A1 12/2007 Spengler et al.
2008/0140362 A1 6/2008 Gross et al.
2008/0252309 A1 10/2008 Gross et al.
2008/0252441 A1 10/2008 McElfresh et al.
2008/0256398 A1 10/2008 Gross et al.
2009/0099830 A1 4/2009 Gross et al.
2009/0115635 A1 5/2009 Berger et al.
2009/0125467 A1 5/2009 Dhanekula et al.
2009/0306920 A1 12/2009 Zwinger et al.
2010/0023282 A1 1/2010 Lewis et al.
2010/0033386 A1 2/2010 Lewis et al.
2010/0080086 A1 4/2010 Wright et al.
2010/0161525 A1 6/2010 Gross et al.
2010/0305892 A1 12/2010 Gross et al.
2010/0306165 A1 12/2010 Gross et al.
2012/0030775 A1 2/2012 Gross et al.
2012/0111115 A1 5/2012 Ume et al.
2013/0157683 A1 6/2013 Lymberopoulos et al.
2013/0211662 A1 8/2013 Blumer et al.
2015/0137830 A1 5/2015 Keller, III et al.
2016/0098561 A1 4/2016 Keller et al.
2016/0258378 A1 9/2016 Bizub et al.
2017/0163669 A1 6/2017 Brown et al.
2017/0301207 A1 10/2017 Davis et al.
2018/0011130 A1 1/2018 Aguayo Gonzalez et al.
2018/0276044 A1 9/2018 Fong et al.
2018/0349797 A1 12/2018 Garvey et al.
2019/0064034 A1 2/2019 Fayfield et al.
2019/0102718 A1 4/2019 Agrawal
2019/0163719 A1 5/2019 Gross et al.
2019/0196892 A1 6/2019 Matei et al.
2019/0197045 A1 6/2019 Kraljevic
2019/0197145 A1 6/2019 Gross et al.
2019/0237997 A1 8/2019 Tsujii et al.
2019/0243799 A1 8/2019 Gross et al.
2019/0286725 A1 9/2019 Gawlick et al.
2019/0378022 A1 12/2019 Wang et al.
2020/0125819 A1 4/2020 Gross et al.
2020/0191643 A1 6/2020 Davis
2020/0201950 A1 6/2020 Wang et al.
2020/0242471 A1 7/2020 Busch
2020/0387753 A1 12/2020 Brill et al.
2021/0081573 A1 3/2021 Gross et al.
2021/0158202 A1 5/2021 Backlawski et al.
2021/0174248 A1 6/2021 Wetherbee et al.
2021/0270844 A1 9/2021 Wetherbee et al.
2021/0270884 A1 9/2021 Wetherbee et al.
2021/0295210 A1* 9/2021 Wetherbee ............. G06N 20/00
2022/0121955 A1 4/2022 Chavoshi et al.
2022/0206480 A1* 6/2022 Balasubramanian ........................ G05B 19/4183

OTHER PUBLICATIONS

Patent Cooperation Treaty (PCT), International Search Report and Written Opinion issued in PCT International Application No. PCT/US2020/060083 having a date of mailing of Mar. 19, 2021 (13 pgs).

Patent Cooperation Treaty (PCT), International Search Report and Written Opinion issued in PCT International Application No. PCT/US2021/015802 having a date of mailing of May 28, 2021 (13 pgs).

Patent Cooperation Treaty (PCT), International Search Report and Written Opinion issued in PCT International Application No. PCT/US2021/013633 having a date of mailing of May 6, 2021 (10 pgs).

Huang H, et al. "Electronic counterfeit detection based on the measurement of electromagnetic fingerprint," Microelectronics Reliability: an Internat . Journal & World Abstracting Service, vol. 55, No. 9, Jul. 9, 2015 (Jul. 9, 2015) pp. 2050-2054.

Patent Cooperation Treaty (PCT), International Search Report and Written Opinion issued in PCT International Application No. PCT/US2021/014106 having a date of mailing of Apr. 26, 2021 (9 pgs).

Patent Cooperation Treaty (PCT), International Search Report and Written Opinion issued in PCT International Application No. PCT/US2021/015359 having a date of mailing of Apr. 9, 2021 (34 pgs).

Wald, A, "Sequential Probability Ratio Test for Reliability Demonstration", John Wiley & Sons, 1947.

Patent Cooperation Treaty (PCT), International Search Report and Written Opinion issued in PCT International Application No. PCT/US2021/062380 having a date of mailing of May 24, 2022 (10 pgs).

Dickey et al.; Checking for Autocorrelation in Regression Residuals; pp. 959-965; Proceedings of 11th Annual SAS Users Group International Conference; 1986.

Hoyer et al.; Spectral Decomposition and Reconstruction of Nuclear Plant Signals; pp. 1153-1158; published Jan. 1, 2005; downloaded on Jul. 14, 2021 from: https://support.sas.com/resources/papers/proceedings-archive/SUGI93/Sugi-93-193%20Hoyer%20Gross.pdf.

Kenny Gross, Oracle Labs; MSET2 Overview: "Anomaly Detection and Prediction" Oracle Cloud Autonomous Prognostics; p. 1-58; Aug. 8, 2019.

Guo, "Implementation of 3D kiviat diagrams." (2008) Year: 2008 pp. 1-37.

Abran et al., "Estimation models based on functional profiles." Intl. Workshop on Software Measurement—IWSM/MetriKon, Kronisburg (Germany) Shaker Verlag. 2004 (Year: 2004).

Wang et al., Process Fault Detection Using Time-Explicit Kiviat Diagrams:, Al Che Journal 61.12 (2015): 4277-4293).

Whisnant et al; "Proactive Fault Monitoring in Enterprise Servers", 2005 IEEE International Multiconference in Computer Science & Computer Engineering, Las Vegas, NV, Jun. 27-30, 2005.

U.S. Nuclear Regulatory Commission: "Technical Review of On-Lin Monitoring Techniques for Performance Assessment vol. 1: State-of-the-Art", XP055744715, Jan. 31, 2006, pp. 1-132.

Garcia-Martin Eva et al., "Estimation of Energy Consumption in Machine Learning," Journal of Parallel and Distributed Computing, Elsevier, Amsterdan, NL, vol. 134, Aug. 21, 2019 (Aug. 21, 2019), pp. 77-88.

(56) References Cited

OTHER PUBLICATIONS

Bouali Fatma et al. "Visual mining of time series using a tubular visualization," Visual Computer, Springer, Berlin, DE, vol. 32, No. 1, Dec. 5, 2014 (Dec. 5, 2014), pp. 15-30.
Gribok, et al,. "Use of Kernel Based Techniques for Sensor Validation in Nuclear Power Plants," International Topical Meeting on Nuclear Plant Instrumentation, Controls, and Human-Machine Interface Technologies (NPIC & HMIT 2000), Washington, DC, Nov. 2000, pp. 1-15.
Gross, K. C. et al., "Application of a Model-Based Fault Detection System to Nuclear Plant Signals," downloaded from https://www.researchgate.net/publication/236463759; Conference Paper: May 1, 1997, 5 pages.
Singer, et al., "Model-Based Nuclear Power Plant Monitoring and Fault Detection: Theoretical Foundations," Intelligent System Application to Power Systems (ISAP '97), Jul. 6-10, 1997, Seoul, Korea pp. 60-65.
Yesilli et al.: "On Transfer Learning for Chatter Detection in Turning using Wavelet Packet Transform and Ensemble Empirical Mode Decomposition", CIRP Journal of Manufacturing Science and Technology, Elsevier, Amsterdam, NL, vol. 28, Dec. 30, 2019 (Dec. 30, 2019), pp. 118-135.
Lopez-Oriona, et al., Quantile-Based Fuzzy Clustering of Multivariate Time Series in the Frequency Domain; Elsevier—Fuzzy Sets and Systems 433 (2022) pp. 115-154).
Holan et al.; Time Series Clustering and Classification Via Frequency Domain Methods; WIREs Computational Statistics / vol. 10, Issue 6 / e1444; pp. 1-3; first published Jul. 20, 2018.
Abebe Diro et al.; A Comprehensive Study of Anomaly Detection Schemes in IoT Networks Using Machine Learning Algorithms; pp. 1-13; 2021; downloaded from: https://doi.org/10.3390/s21248320.
Zhenlong Xiao, et al.; Anomalous IoT Sensor Data Detection: An Efficient Approach Enabled by Nonlinear Frequency-Domain Graph Analysis; IEEE Internet of Things Journal, Aug. 2020; pp. 1-11.
Sutrisno Edwin: "Midimax Compression for Large Time-Series Data", dated Apr. 18, 2022, pp. 1-8, retrieved from the Internet at: URL:http://towardsdatascience.com/midimax-data-compression-for-large-time-series-data-daf744c89310, retrieval date Nov. 1, 2023.
Lkhagva B et al: "New Time Series Data Representation ESAX for Financial Applications", Data Engineering Workshops 2006, Proceedings 22nd International Conference on Atlanta GA, USA Mar. 7- Apr. 2006 Piscataway, NJ, USA IEEE. (6 pgs.).
Choi Kukjin et al: "Deep Learning for Anomaly Detection in Time-Series Data: Review, Analysis, and Guidelines", IEEE Access, IEEE, USA, vol. 9, Aug. 26, 2021, p.
Gross Kenny et al: "AI Decision Support Prognostics for IoT Asset Health Monitoring, Failure Prediction, Time to Failure", 2019 International Conference on Computational Science and Computational Intelligence (CSCI), IEEE, Dec. 5, 2019, pp. 244-248.
1st NF OA from U.S. Appl. No. 16/804,531, filed Feb. 28, 2020, having a date of mailing of Jul. 20, 2021, 51 pgs.
Wang, Ray C., et al., Process Fault Detection Using Time-Explicit Kiviat Diagrams. AlChE Journal 61.12 (2015): 4277-4293.
Sou, Yuhua, "Implementation of 3d Kiviat Diagrams." (2008). (Year: 2008).

* cited by examiner

OFF-DUTY-CYCLE-ROBUST MACHINE LEARNING FOR ANOMALY DETECTION IN ASSETS WITH RANDOM DOWN TIMES

CROSS REFERENCE TO RELATED APPLICATIONS

This disclosure claims the benefit of U.S. Provisional Patent Application Ser. No. "63/148,744" filed Feb. 12, 2021, titled "OFF-DUTY-CYCLE-ROBUST MACHINE LEARNING FOR ANOMALY DETECTION IN ASSETS WITH RANDOM DOWNTIMES", having inventors William A. WIMSATT, Matthew T. GERDES, Kenny C. GROSS and Guang C. WANG, and assigned to the present assignee, which is incorporated by reference herein in its entirety.

BACKGROUND

An Internet-of-Things (IoT)-connected asset (or device) generates time series data that describes operation of the asset. Machine Learning (ML) prognostic fault monitoring of this IoT time series data may be used to detect early signs of wear, failure, and fault conditions in the asset.

A longtime challenge for ML prognostics of time series signals is applying ML prognostics to assets that are not turned on and left on for long periods of time, but may instead be intermittently turned on and off. Even more challenging are use cases where the off-duty-cycle is typically greater than the on-duty-cycle, and moreover, when the downtime periods are not at fixed intervals, but can occur at random times, and the durations for the off-duty-cycles are variable (and un-knowable in advance).

Accordingly, a solution for prognostic monitoring of assets that can be intermittently off, with the off states occurring at random times, and for random durations is needed.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
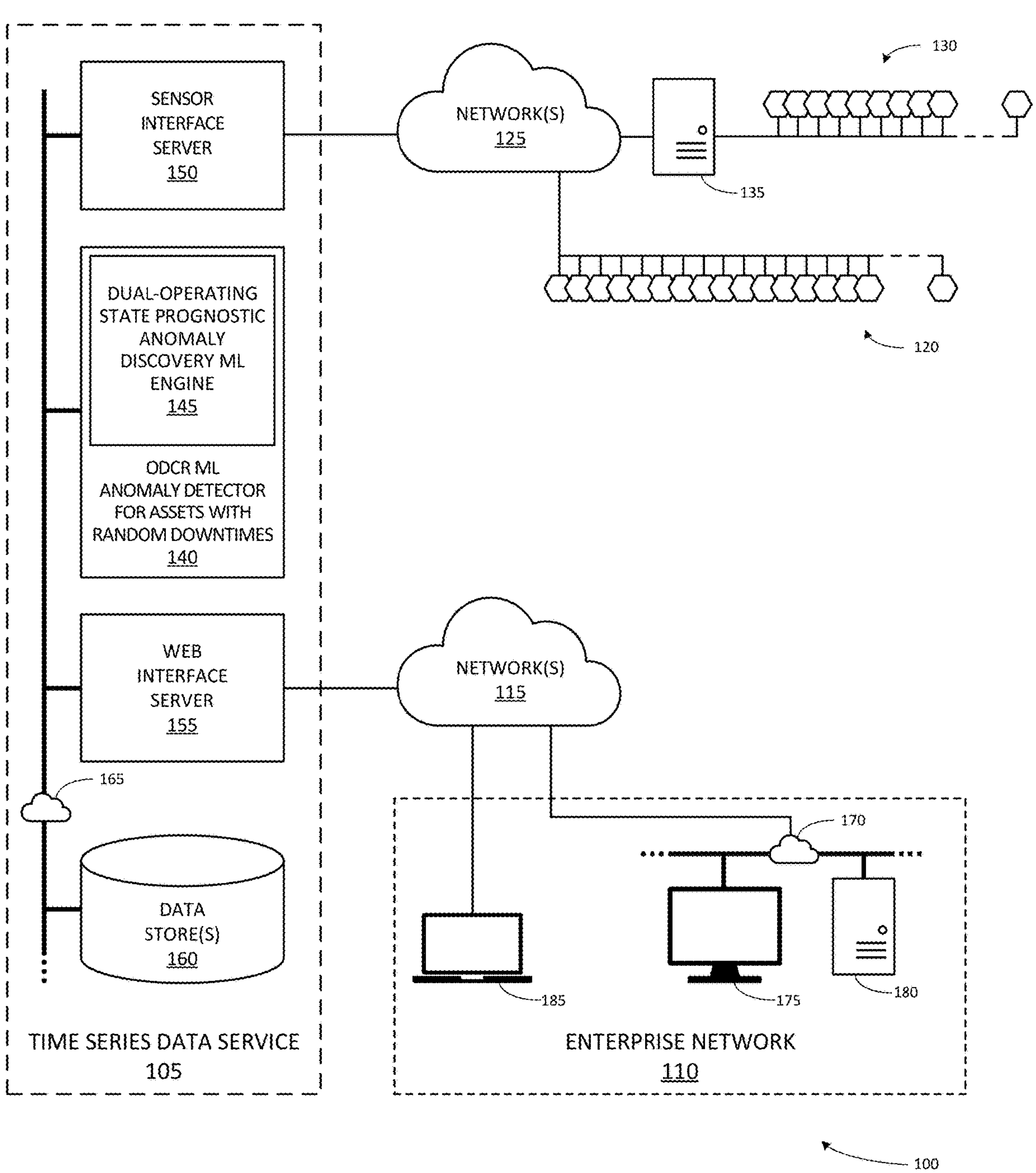
FIG. 1 illustrates one embodiment of a system associated with off-duty-cycle-robust machine learning for anomaly detection in assets with random down times.

Systems and methods are described herein that provide off-duty-cycle-robust machine learning for anomaly detection in assets with random downtimes. In one embodiment, the systems and methods described herein present a novel solution for prognostic monitoring of assets that can be intermittently off, with the off states (i) occurring at random times, and (ii) continuing for random durations. In one embodiment, the solution described herein may be referred to as Off-Duty-Cycle-Robust (ODCR) ML. In one embodiment, ML systems for prognostic monitoring of assets may be considered off-duty-cycle-robust when they are able to prognostically monitor the operation of an asset through random-duration uptime (also referred to as "on" duty cycle or operation), random-duration downtime (also referred to as "off" duty cycle or shutdown), and the transitions between those states, without presenting false alerts or missed alerts, even when asset sensors continue reporting during the off-cycle. The systems and methods for ODCR ML described herein satisfy these criteria, detecting early signs of wear, failure, and fault conditions in the asset extremely well even when the monitored signals don't "disappear" (or go to all zeros) during asset shutdown periods, but instead keep collecting background activity. In one embodiment, the ML technique applied is the Multivariate State Estimation Technique (MSET). ODCR ML as described herein offers the first system and method for prognostic ML that solves this intermittent down-time challenge. ODCR ML as described herein accommodates variable off-duty-cycle durations. ODCR ML as described herein removes any need for external curation to identify duty cycles before detecting anomalies during the On-Duty-Cycle operation.

MSET is an advanced, regression-based pattern recognition technique. Like other forms of regression-based pattern recognition, such as neural networks (NNs) and support vector machines (SVMs), MSET is applied when monitoring the patterns of time series signals from dense-sensor IoT industries (such as Oil & Gas production, Utilities, Aviation, home appliances, and data center information technology (IT) assets) and detects the incipience or onset of anomalies in the monitored assets. Anomalous operation of sensed equipment may be an early indication of impending failure of the equipment, and calls for service. An advantage MSET has over other forms of ML such as NNs and SVMs is lower false-alarm probabilities (FAPs) and missed-alarm probabilities (MAPs), each of which are likely to have very costly consequences. FAPs may be costly due to unnecessary shutdown for maintenance. MAPs may be costly due to equipment failure, damage, or even loss of life.

One challenge addressed by the systems and methods described herein with ML predictive analytics is assembling training data (for training an ML model), and also surveillance data (after the ML model is trained) when the assets are operating. Some high-cost assets are operating most of their life. For example, servers in business-critical data centers may be operational 99.999% of their lifetime. Similarly, commercial nuclear plants are almost never shut down—nuclear plants operate for either 12 months or 18 months continuously, then shut down briefly for refueling, and do that for the 50+ year lifetimes of the plants. For assets that are "up" (that is, in operation) much more than they are "down" (that is, offline or not in operation), it is straightforward to train the ML with data that is 100% "up", then "ignore," "snip out" or otherwise curate any brief down times from the training data, and to similarly just "turn off" the prognostics during brief down times while assets are under surveillance.

ML Prognostics was therefore initially only applied to very expensive assets with very high availability requirements. Compute cost was so high for ML prognostics at the time that they were first introduced that ML prognostics had to run on very expensive computers to be able to keep up with real time. This compute cost used to be so great that it would simply be economically infeasible to apply MSET, NNs, or SVMs to low-cost commodities.

But, thanks to Moore's Law (observing the approximate doubling of computer processing power every two years) computer processing power has increased to be able to handle the compute cost of ML prognostics inexpensively. Serious ML prognostics can now be applied to much lower cost assets. A further factor that is currently extending the reach of advanced ML prognostics is cloud computing. It is no longer necessary to have a dedicated computer to perform the prognostic computations for each asset under surveillance. It is now possible to send hundreds of thousands of signals from widely dispersed assets into the cloud for prognostic anomaly detection.

Extending the benefits of advanced ML prognostics to low-cost assets has brought a new challenge: Low-cost assets such as home appliances are rarely "on" all the time in the manner of nuclear plants and data centers. This creates logistical difficulties in the aggregation and curation of signals for ML training. Conventional ML prognostic techniques operate only on "up time" signals. In such conventional systems, it is therefore necessary to cull the shutdown times from the training datasets and "stitch together" the uptime data so that only concatenated chunks with no downtime gaps would be presented to the ML algorithm for training. The systems and methods described herein adapt ML prognostics to assets with intermittent off-duty-cycles of variable length and numerous downtime gaps, and which may be off more than they are on.

A longtime challenge for machine learning (ML) prognostics of time series signals is when prognostics are applied to assets that are not on for long periods of time, but may be intermittently on or off. Even more challenging are use cases where (i) the off-duty-cycle is typically greater than the on-duty-cycle, (ii) when the downtime periods are not at fixed intervals, but can occur at random times, or (iii) the durations for the off-duty-cycles are variable (and un-knowable in advance), or some combination of these three factors. In one embodiment, the systems and methods described herein for ODCR ML present a novel solution for prognostic monitoring of assets that can be intermittently off, with the off states occurring at random times, and for random durations.

It is not uncommon for assets that are not actively in use to also be not powered off, or at least have sensors that are still reporting data. For example, assets in manufacturing plants may "drop to idle" between production runs, but still be powered on and collecting stationary noisy data, or else dynamic ambient data. This is also the case with many assets in the utility sector, which increasingly relies on Combined Cycle Gas Turbine (CCGT) plants for electrical generation. In CCGT plants there are many assets (such as boilers, heat exchangers turbines, and combustion chambers) that come on and go off as loads and demands change throughout the day. In these cases when the assets go off, the assets cease doing any useful work, but are not powered off. Rather, the assets go to "idle standby" and all internal and external sensors go to ambient levels. The transition to ambient levels may be practically instantaneous, or a gradual decay.

In one embodiment, the systems and methods described herein enable a dual-operating state prognostic anomaly discovery machine learning engine that autonomously handles any temporal distribution of on/off duty cycle operational modes. The dual-operating state ODCR ML automatically shifts between configurations for monitoring on-duty-cycle operation and off-duty-cycle operation of an asset in response to detecting a transition from one duty cycle to another in the monitored time series signals for the asset. The systems and methods for ODCR ML described herein can robustly monitor time series signals in which downtime data segments (or chunks) may be randomly distributed in time, and may have random durations. Also, the systems and methods described herein can accommodate asset downtime modes that include (i) no telemetry—no time series signal is provided from the asset when the asset is in downtime mode or off duty (when the asset is off, telemetry is off); (ii) non-active with telemetry on stationary background—the asset is put in a non-active state, but sensors remain live and recording stationary stochastic background activity; and (iii) non-active with telemetry on dynamic background—the asset is put in a non-active state, but sensors remain live and recording dynamic correlated background activity. The systems and methods described herein can accommodate combinations of these modes, where different sensors of the asset operate in different downtime modes. Further, the systems and methods described herein enable downtime data segments (or chunks) to be distributed in training data, surveillance data, in both training and surveillance data, or in neither training nor surveillance data—the systems and methods described herein thus handle all downtime data occurrences automatically, without data scientist attention or manual curation. The systems and methods for OCDR ML described herein accomplish each of these improvements without sacrificing accuracy or suffering increases in FAPs or MAPs.

In one embodiment, the uptime (on-duty-cycle) and downtime (off-duty-cycle) segments of time series signals are each automatically detected and automatically concatenated into an uptime signal and a downtime signal, respectively. The separated uptime and downtime signals may be used in both training and surveillance.

No action or function described or claimed herein is performed by the human mind. An interpretation that any action or function can be performed in the human mind is inconsistent and contrary to this disclosure.

Example Environment

FIG. 1 illustrates one embodiment of a system 100 associated with off-duty-cycle-robust machine learning for anomaly detection in assets with random down times.

In one embodiment, the system 100 includes a time series data service 105 and an enterprise network 110 connected by a network 115 such as the Internet. The time series data service 105 is connected either directly to sensors (such as sensors 120) or remote terminal units (RTUs) through a network 125 or indirectly to sensors (such as sensors 130) or RTUs through one or one or more upstream devices 135. In one embodiment, networks 115 and 125 are the same network, and in another embodiment, networks 115 and 125 are separate networks.

In one embodiment, time series data service 105 includes various systems such as off-duty-cycle-robust machine learning anomaly detector for assets with random downtimes 140 that includes dual-operating state prognostic anomaly discovery machine learning engine 145, a sensor interface server 150, a web interface server 155, and data store 160. Each of these systems 140-160 are configured with logic, for example by various software modules, for executing the functions they are described as performing. In one embodiment, the components of time series data service 105 are implemented on one or more hardware computing devices or hosts interconnected by a data network or cloud network (such as server-side network 165). For example, the components of time series data service 105 may be executed by network-connected computing devices of one or more compute hardware shapes, such as standard (or general purpose) shapes, dense input/output (I/O) shapes, graphics processing unit (GPU) shapes, and high-performance computing (HPC) shapes. In one embodiment, the components of time series data service 105 are each implemented by dedicated computing devices. In one embodiment, several or all components of time series data service 105 are implemented by a common (or shared) computing device, even though represented as discrete units in FIG. 1. In one embodiment, components of time series data service 105 may be implemented across multiple computing devices.

In one embodiment, the components of time series data service 105 intercommunicate by electronic messages or signals. These electronic messages or signals may be configured as calls to functions or procedures that access the features or data of the component, such as for example application programming interface (API) calls. In one embodiment, these electronic messages or signals are sent between hosts in a format compatible with transmission control protocol/internet protocol (TCP/IP) or other computer networking protocol. Each component of time series data service 105 may (i) generate or compose an electronic message or signal to issue a command or request to another component, (ii) transmit the message or signal to other components using the infrastructure of scheduling, dispatch, and routing system 105 and (iii) parse the content of an electronic message or signal received to identify commands or requests that the component can perform, and in response to identifying the command, the component will automatically perform the command or request.

In one embodiment, time series data service 105 may be implemented as a service on cloud infrastructure. In one embodiment, time series data service 105 may be hosted by a dedicated third party, for example in an infrastructure-as-a-service (IAAS), platform-as-a-service (PAAS), or software-as-a-service (SAAS) architecture. In one embodiment, time series data service 105 may be implemented on on-premises infrastructure, such as a set of one or more dedicated servers.

In one embodiment, time series data service 105 may be hosted by a third party, and/or operated by a third party for the benefit of multiple account owners/tenants, each of whom is operating a business, and each of whom has an associated enterprise network 110. In one embodiment, either of time-series service 105 and enterprise network 110 may be associated with business entities operating in any of a variety of dense-sensor (that is, using a high number of sensors) IoT industries (such as Oil & Gas production, Utilities, Aviation, home appliances, and data center IT). In one embodiment, time series data service 105 is configured with logic, such as software modules, to operate the time series data service 105 to prognostically detect or discover anomalous operation in assets with random downtimes in accordance with the systems and methods described herein.

In one embodiment, sensors or RTUs 120, 130 are configured to monitor physical phenomena occurring in or around an asset (such as a machine, device, system, or facility) In one embodiment, sensors or RTUs 120, 130 may be operably connected to assets or otherwise configured to detect and monitor physical phenomena occurring in or around the asset. The assets generally include any type of machinery or facility with components that perform measurable activities. The sensors or RTUs 120, 130 may be network-connected sensors for monitoring any type of physical phenomena. The network connection of the sensors or RTUS 120, 130 may be wired or wireless. The sensors 120, 130 may include (but are not limited to): a voltage sensor, a current sensor, a temperature sensor, a pressure sensor, a rotational speed sensor, a thermometer, a flow meter sensor, a vibration sensor, a microphone, a photosensor, an electromagnetic radiation sensor, a proximity sensor, an occupancy sensor, a motion sensor, a gyroscope, an inclinometer, an accelerometer, a global positioning system (GPS) sensor, a torque sensor, a flex sensor, a moisture monitor, a liquid level sensor, an electronic nose, a nuclear radiation detector, or any of a wide variety of other sensors or transducers for generating electrical signals that describe detected or sensed physical behavior.

In one embodiment, the sensors 120, 130 are connected through network 125 to sensor interface server 150. In one embodiment, sensor interface server 150 is configured with logic, such as software modules, to collect readings from sensors 120, 130 and store them as observations in a time series data structure, for example in data store 160. The sensor interface server 150 is configured to interact with the sensors, for example by exposing one or more application programming interfaces (APIs) configured to accept readings from sensors using sensor data formats and communication protocols applicable to the various sensors 120, 130. The sensor data format will generally be dictated by the sensor device. The communication protocol may be a custom protocol (such as a legacy protocol predating IoT implementation) or any of a variety of IoT or machine to machine (M2M) protocols such as Constrained Application Protocol (CoAP), Data Distribution Service (DDS), Devices Profile for Web Services (DPWS), Hypertext Transport Protocol/Representational State Transfer (HTTP/REST), MQ Telemetry Transport (MQTT), Universal Plug and Play (UPnP), Extensible Messaging and Presence Protocol (XMPP), ZeroMQ, and other communications protocols that can be carried by the transmission control protocol—internet protocol or user datagram protocol (TCP/IP or UDP) transport protocols. SCADA protocols such as OLE for Process Control Unified Architecture (OPC UA), Modbus RTU, RP-570, Profibus, Conitel, IEC 60870-5-101 or 104, IEC 61850, and DNP3 may also be employed when extended to operate over TCP/IP or UDP. In one embodiment, the sensor interface server 150 polls sensors 120, 130 to retrieve sensor readings. In one embodiment, the sensor interface server passively receives sensor readings actively transmitted by sensors 120, 130.

For simplicity and clarity of explanation, the enterprise network 110 is represented by an on-site local area network 170 to which one or more personal computers 175, or servers 180 are operably connected, along with one or more remote user computers 185 that are connected to the enterprise network 110 through the network 115 or other suitable communications network or combination of networks. The personal computers 175 and remote user computers 185 can be, for example, a desktop computer, laptop computer, tablet computer, smartphone, or other device having the ability to connect to local area network 170 or network 115 or having other synchronization capabilities. The computers of the enterprise network 110 interface with time series data service 105 across the network 115 or another suitable communications network or combination of networks.

In one embodiment, remote computing systems (such as those of enterprise network 110) may access information or applications provided by the time series data service 105 through web interface server 155. For example, computers 175, 180, 185 of the enterprise network 110 may access OCDR ML anomaly detector for assets with random downtimes 140 from time series data series data service 105. In one embodiment, the remote computing system may send requests to and receive responses from web interface server 155. In one example, access to the information or applications may be effected through use of a web browser on a personal computer 175 or remote user computers 185. For example, these computing devices 175, 180, 185 of the enterprise network 110 may request and receive a web-page-based graphical user interface (GUI) for accessing monitoring and alert information provided by OCDR ML anomaly detector for assets with random downtimes 140. In one example, these communications may be exchanged between web interface server 155 and server 180, and may take the form of remote representational state transfer (REST) requests using JavaScript object notation (JSON) as the data interchange format for example, or simple object access protocol (SOAP) requests to and from XML servers.

In one embodiment, data store 160 includes one or more databases (such as time-series databases) configured to store and serve time series data received by sensor interface server 150 from sensors 120, 130. The time series data may consist of values sensed by one or more sensors at regular or irregular intervals and stored in association with both the sensor and the time the value was sensed. In one embodiment, the time-series database is an Oracle® database configured to store and serve time-series data. In some example configurations, data store(s) 160 may be implemented using one or more Oracle® Exadata compute shapes, network-attached storage (NAS) devices and/or other dedicated server device. API calls may include queries against databases. The queries may be composed in SQL and executed in a SQL runtime, or use other appropriate query languages and environments.

In one embodiment, upstream device 135 may be a third-party service for managing IoT connected devices. Or, in one embodiment, upstream device 135 may be a gateway device configured to enable sensors 130 to communicate with sensor interface server 150 (for example, where sensors 130 are not IoT-enabled, and therefore unable to communicate directly with sensor interface server 150).

MSET Alerting on Continuous Operation Time Signal Data

Figure 2:
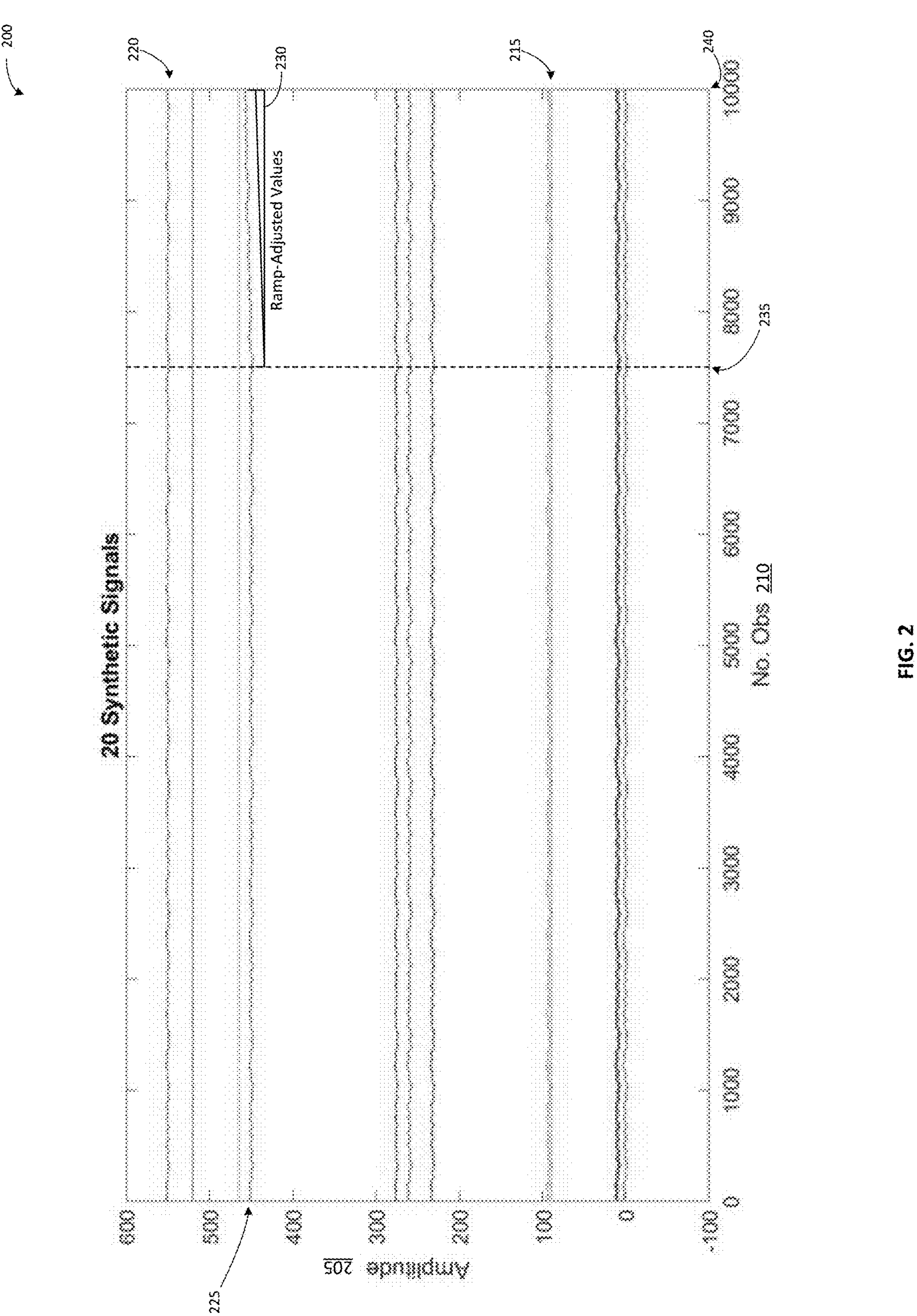
FIG. 2 illustrates a synthesized example time signal database with twenty signals that mimics an asset in the utility industry.
Figure 3:
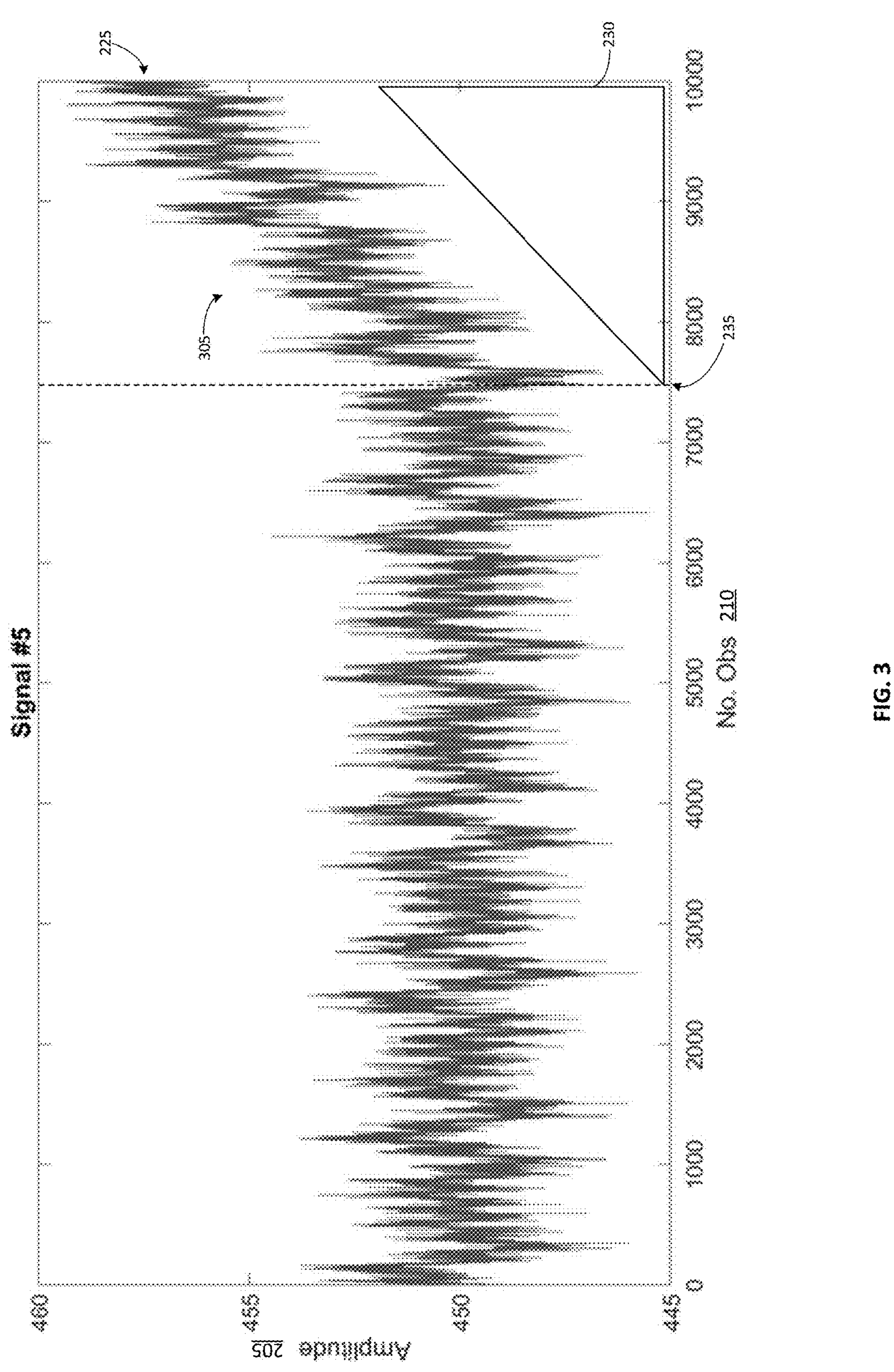
FIG. 3 illustrates an example of one signal in the synthesized time signal data undergoing a slow, drifting degradation mode.
Figure 4:
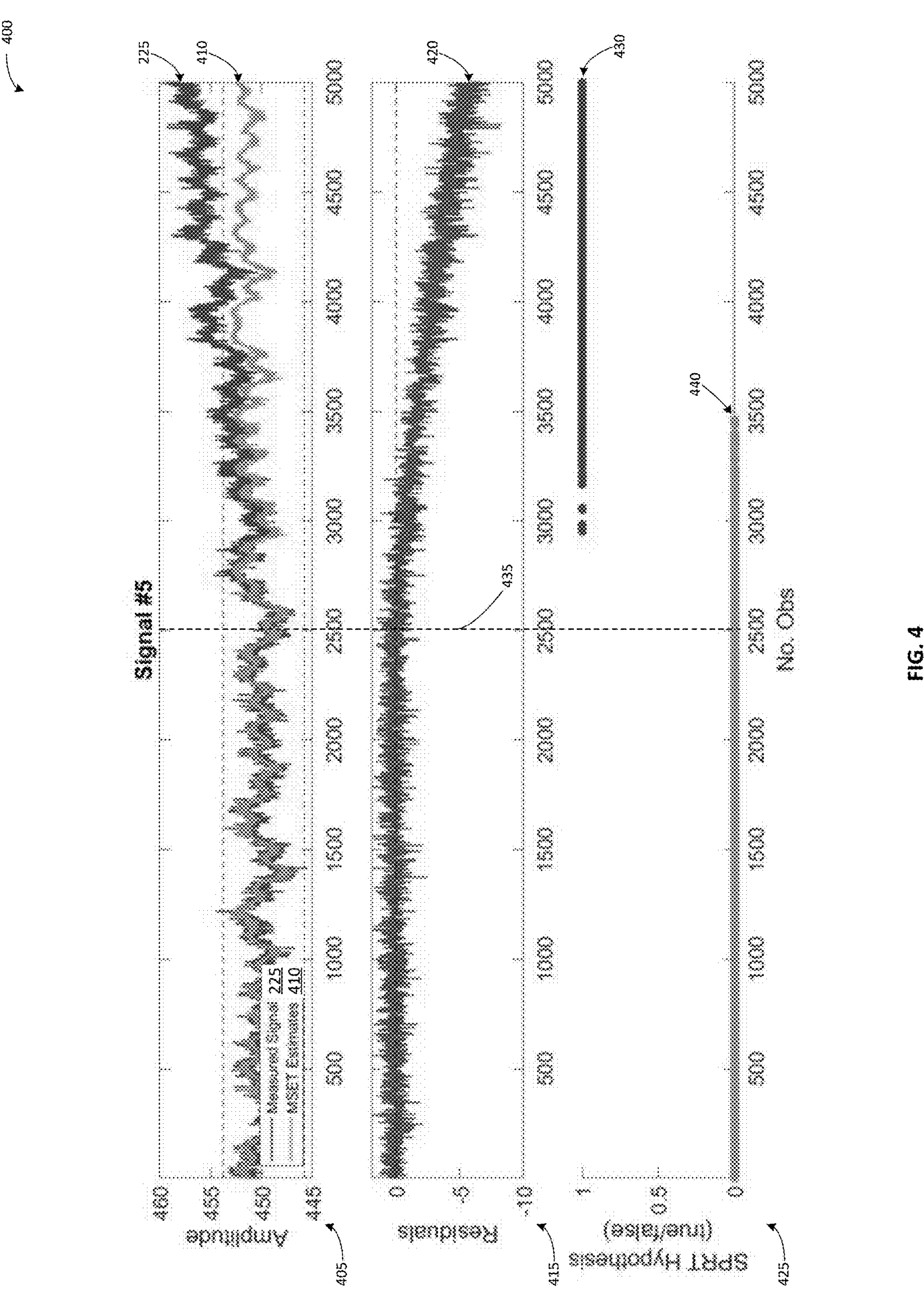
FIG. 4 illustrates alarms triggered by an MSET model monitoring the signal that is undergoing the slow, drifting degradation mode.

FIGS. 2-4 show an example of operation of MSET-based ML prognostics on time series signals for continuously operating assets. FIG. 2 illustrates a synthesized example time signal database 200 with twenty signals that mimics an asset in the utility industry (that is, the signal database is generated to emulate an utility asset) with a continuous duty cycle—such as an oil pump or steam turbine—with twenty sensors monitoring its operation. The amplitude values of the signals over time are plotted against amplitude axis 205 and observations axis 210. The sensor-output values of a signal may change over time based on sensed phenomena. Utility assets commonly have sensors monitoring several different physical phenomena, such as: motor rotations per minute, intake pressures, temperatures, voltage changes, and electrical currents. As a consequence, the output signals associated with the asset have disparate amplitude ranges, as can be seen in FIG. 2. For example, Signal Nos. 3 and 4 215 may be thermometer-sensed temperature values, and reflect an operating temperature of the asset just below 100 degrees, while Signal No. 9 220 may be tachometer-sensed rotations per minute (RPM), and reflect an operating rotation speed of a motor in the asset of about 550 RPM, each plotted against the same general amplitude axis 205.

As an asset with continuously recorded sensor readings, an MSET model would be trained on signal(s) of normal or ordinary operating conditions for this asset, and then continue to monitor these signals (moving without interruption from training to monitoring phases), and notifying the user when degradation begins. As a simple example, an MSET model is trained on and then monitors Signal No. 5 225. In one embodiment, the model may be trained for the first 5000 observations, and then monitor for the subsequent 5000 observations. In one embodiment, Signal No. 5 225 represents a sensed electrical current drawn by the asset, of approximately 450 Amps. To simulate a slow, drifting, degradation mode a ramp 230 was inserted onto Signal No. 5 225 beginning at observation 7500 235. Ramp 230 adjusts the observed values of Signal No. 5 225 upward by a steady amount. For example, at each observation following observation 7500 235, the observed value of Signal No. 5 may be adjusted upward by an additional 2.8 milliamps, resulting in an upward adjustment by the ramp of 7 amps to Signal No. 5 225 by observation 10000. This degraded signal represents an asset slowly drawing higher and higher operating currents after a number of steady observations, which may indicate impending failure. The degraded Signal No. 5 225 is illustrated in FIG. 3 while the resulting alarms triggered from the MSET model are seen in FIG. 4.

FIG. 3 illustrates an example of one signal in the synthesized time signal data 300 undergoing a slow, drifting degradation mode. In particular, FIG. 3 shows the degraded Signal No. 5 225 isolated from the other signals to view the effect (ramp-adjusted values) 305 of inserted ramp 230.

Ramp 230 was inserted to simulate degradation, as discussed above. Signal No. 5 225 shown at a finer scale on Amplitude axis 205 to visually emphasize the change. Simulated signal degradation begins at observation 7500 235, showing ramp-adjusted values 305 from observation 7500 to observation 10000. The signal values from observation 0 to observation 7500 represent a normal operation mode for the asset. The ramp-adjusted signal values from observation 7500 to observation 10000 represent a slow, drifting degradation mode for the asset.

FIG. 4 illustrates plots 400 of aspects of application of MSET-based ML prognostics to Signal No. 5, which is undergoing the slow, drifting degradation mode. The MSET model applied in FIG. 4 is trained based on observations of Signal No. 5 (and/or other sensed signals of the asset) during normal operation of the asset, for example during the first 5000 observations shown in FIGS. 2 and 3. FIG. 4 is composed of three subplots: first subplot 405 showing monitored signal (Signal No. 5 225) compared to the corresponding MSET estimates 410, second subplot 415 showing the resulting residuals 420 between the model-predicted (MSET-estimated) and monitored signals, and third subplot 425 showing the Sequential Probability Ratio Test (SPRT) alarms 430 triggered by the degradation in Signal No. 5 225. FIG. 4 extends over the second 5000 observations (Obs. Nos 5001-10000) of Signal No. 5 225, which is the surveillance portion of the time signal data. The signal begins to undergo the slow, drifting degradation mode beginning at observation 2500 435 (which corresponds to observation 7500 235 in FIGS. 2 and 3). As the magnitude of residuals 420 increases, the SPRT hypothesis begins to shift, on an observation-by-observation basis, from a false, no alarm state 440 to a true, alarm state 430.

Time Signal Data With Random Downtimes

The MSET implementation above works well where the operation of the asset is continuous, but fails when cycles between "on-duty" and "off-duty" operation of the asset occur during training or during monitoring. For example, where "off-duty" cycles occur during training, "off-duty" behavior of the asset will be classified as acceptable behavior during on-duty operation, greatly increasing the potential for MAPs. Or, for example, where no "off-duty" cycles occur during training (and the asset is always "on") during training, "off-duty" cycles of the asset during monitoring will trigger false alarms. The off-duty-cycle-robust machine learning systems and methods described herein for anomaly detection in assets with random down times overcomes these problems in an automatic manner.

Figure 5:
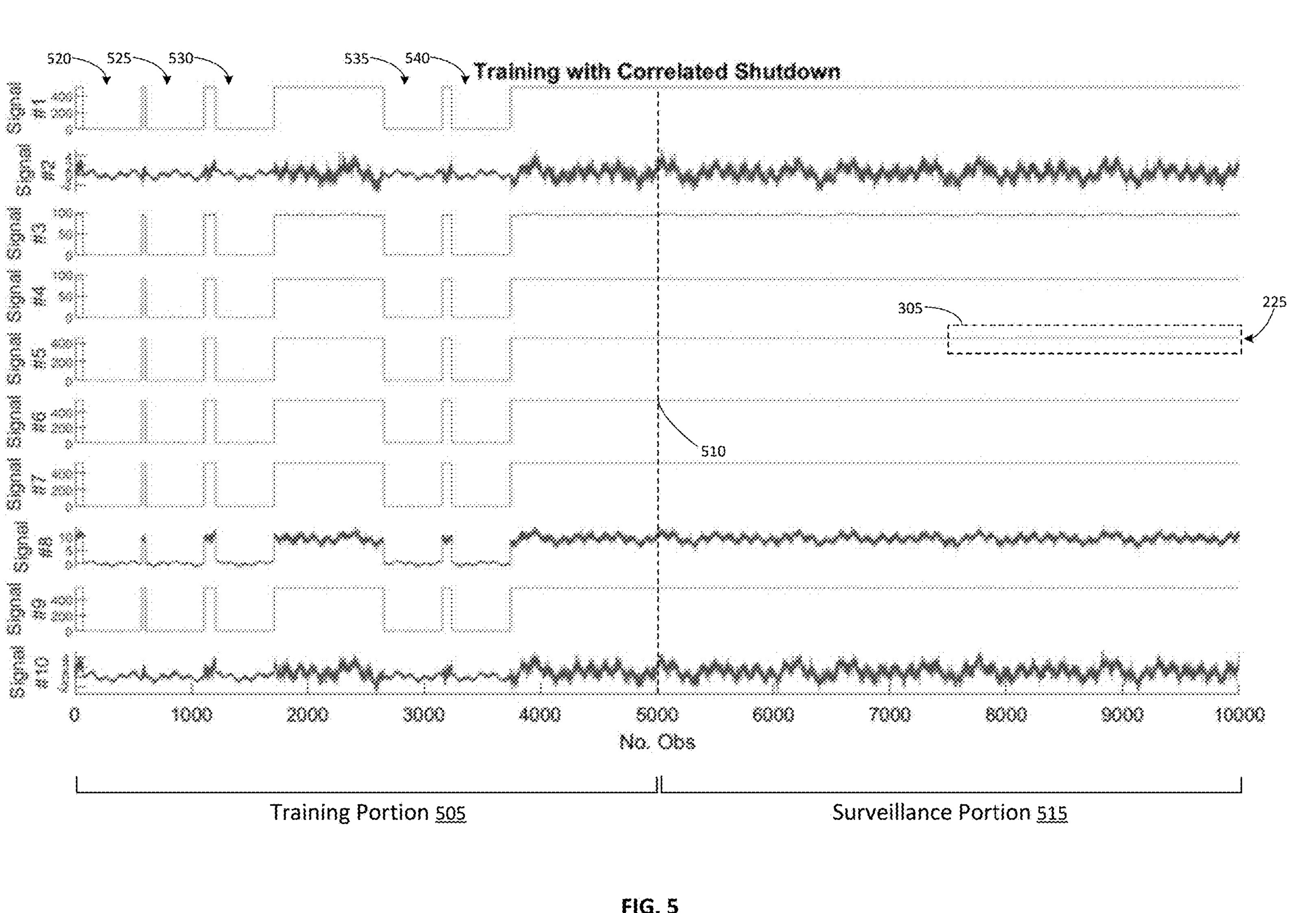
FIG. 5 illustrates a time signal where cycles between on-duty and off-duty are confined to a training portion of the time signal.

Three test cases were utilized to test the generality and viability of the systems and methods described herein. The first test case is the condition where the cycles, between "on-duty" (operational) and "off-duty" (shut down) are isolated into the training portion of the data as seen in FIG. 5. FIG. 5 illustrates a time signal database where cycles between on-duty and off-duty are confined to a training portion 505 of the time signal 500. In FIG. 5, the training portion 505 of the time signal extends from observation 0 to observation 5000 510, and a surveillance portion 515 of the time signal extends from observation 5001 to observation 10000 (and onward). FIG. 5 illustrates the first 10 signals, from 20-signal database 200, where the downtime (off-duty) cycles are contained to the training portion 505 of the signal. The downtime cycles occur at random times during the training portion 505, with a first downtime cycle 520 commencing at approximately observation 50, a second downtime cycle 525 commencing at approximately observation 600, a third downtime cycle 530 commencing at approximately observation 1200, a fourth downtime cycle 535 commencing at approximately observation 2600, and a fifth downtime cycle 540 commencing at approximately observation 3300. The degradation 305 in Signal No. 5 225 occurs beginning at observation 7500, as described herein.

The second test case is the condition where the on-off cycles are isolated to the surveillance potion of the dataset. This second case is a simple application of the systems and methods described herein during training, due to the pristine nature (no on-off cycles) of the training data, and is not pictured in a figure.

Figure 6:
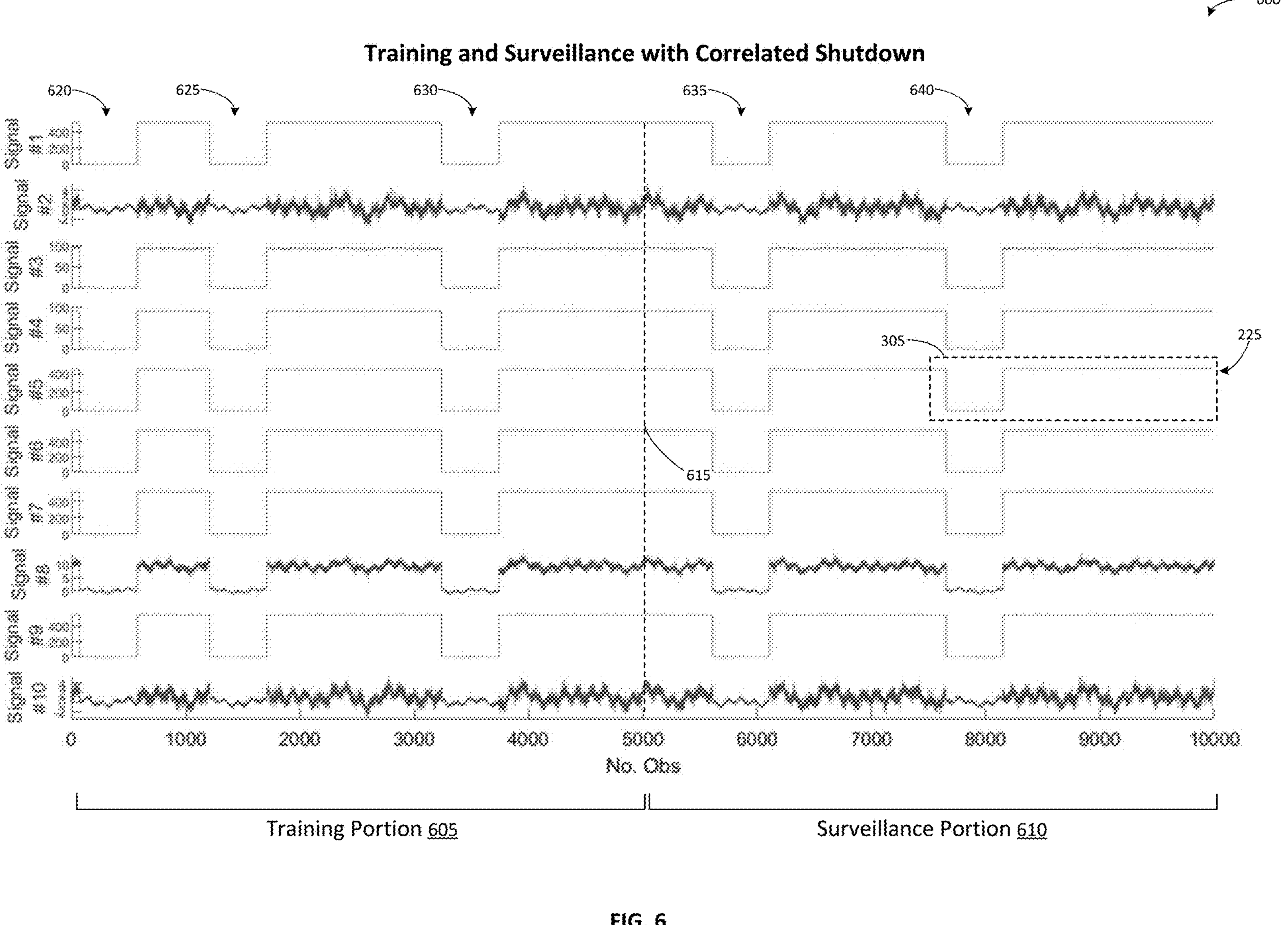
FIG. 6 illustrates a time signal database where cycles between on-duty and off-duty are dispersed to both a training portion and a surveillance portion of the time signal.

The third test case is the condition where the off-duty cycles are dispersed into both the training and surveillance portion, as seen in FIG. 6. FIG. 6 illustrates a time signal database where cycles between on-duty and off-duty operation of an asset are dispersed to both a training portion 605 and a surveillance portion 610 of the time signal 600. As above, the training portion 605 of the time signal extends from observation 0 to observation 5000 615, and a surveillance portion 610 of the time signal extends from observation 5001 to observation 10000 (and onward). FIG. 6 illustrates the first 10 signals, from 20-signal database 200, where the downtime cycles are distributed throughout the entire signal. For instance, first downtime cycle 620 commencing at approximately observation 50, second downtime cycle 625 commencing at approximately observation 1200, and third downtime cycle 630 commencing at approximately observation 3300 each occur during the training portion 605 of the time signals. Fourth downtime cycle 635 commencing at approximately observation 5600 and fifth downtime cycle 640 commencing at approximately observation 7700 each occur during the surveillance portion 610 of the time signals. Moreover, note that downtime cycles may occur during signal degradation without ill effect to the systems and methods described herein. For example, fifth downtime cycle 640 occurs during a portion of the degradation 305 in Signal No. 5 225. In each of FIGS. 5 and 6, only the first 10 signals are shown for brevity. The simulated downtime or "off-duty" cycles in FIGS. 5 and 6 are correlated with the remainder of the time signals shown at FIGS. 2-4, but the downtime cycles were populated with simulated ambient noise rather than simulated operational signal.

Note that in a designated training portion of monitored signals, the signals are considered to represent "normal" activity by the asset. Thus for example, a machine learning model for dynamic background activity during an off-duty cycle is trained with normal dynamic background activity, and a machine learning model for on-duty operation of the asset is trained with normal on-duty activity.

Example Method

In one embodiment, each step of computer-implemented methods described herein may be performed by a processor (such as processor 1302 as shown and described with reference to FIG. 13) of one or more computing devices (i) accessing memory (such as memory 1304 and/or other computing device components shown and described with reference to FIG. 13) and (ii) configured with logic to cause the system to execute the step of the method (such as ODCR ML anomaly detection for assets with random downtimes logic 1330 shown and described with reference to FIG. 13). For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing any data calculated, determined, generated, classified, or otherwise created. References to storage or storing indicate storage as a data structure in memory or storage/disks of a computing device (such as memory 1304, or storage/disks 1306 of computing device 1300, remote computers 1365 shown and described with reference to FIG. 13, or in data stores 160 as shown and described with reference to FIG. 1).

In one embodiment, each subsequent step of a method commences automatically in response to parsing a signal received or stored data retrieved indicating that the previous step has been performed at least to the extent necessary for the subsequent step to commence. Generally, the signal received or the stored data retrieved indicates completion of the previous step.

Figure 7:
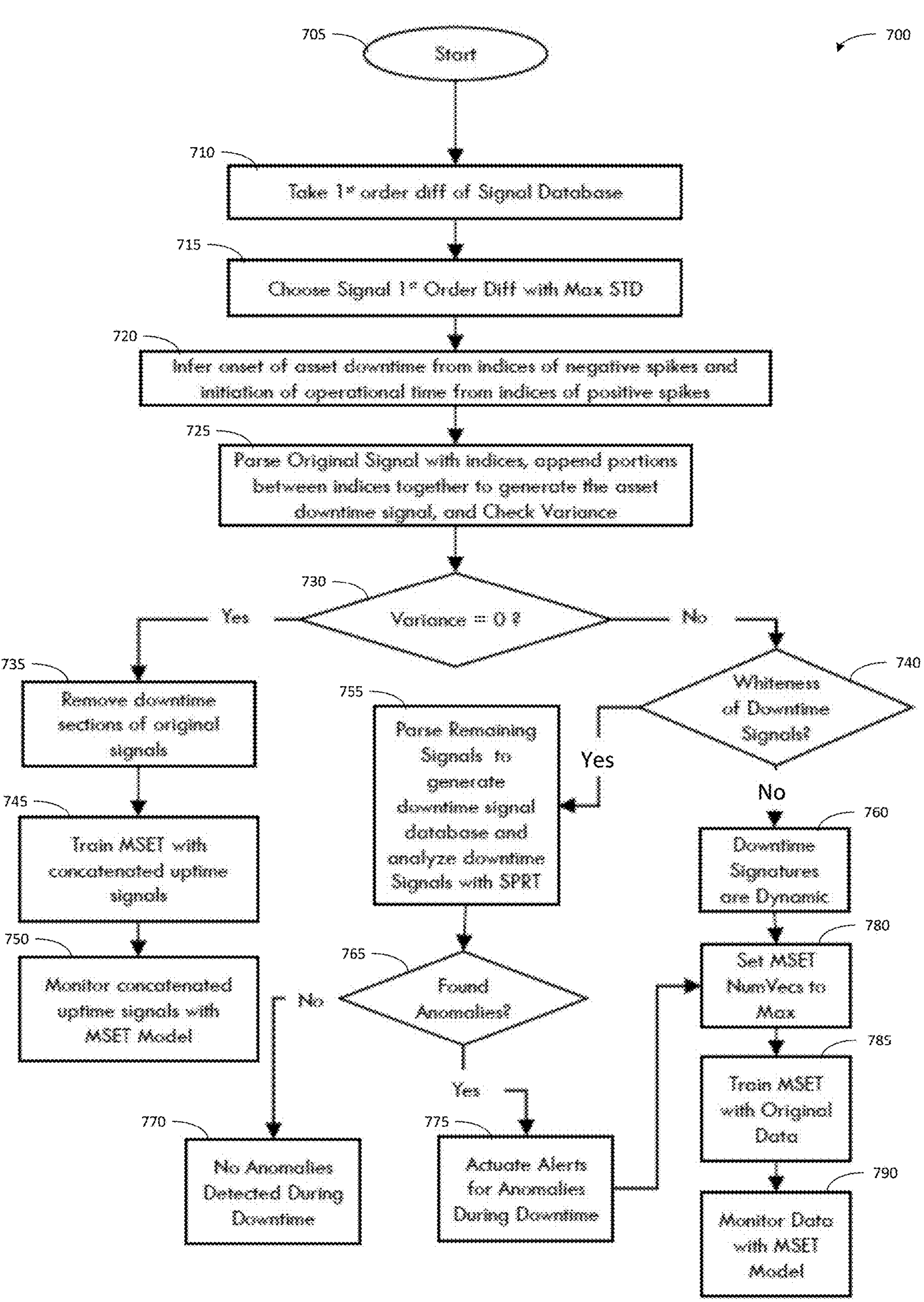
FIG. 7 illustrates one embodiment of a method associated with off-duty-cycle-robust machine learning for anomaly detection in assets with random down times.

FIG. 7 illustrates one embodiment of a method 700 associated with off-duty-cycle-robust machine learning for anomaly detection in assets with random down times. FIG. 7 shows the overall functionality of one embodiment of OCDR ML operation. In one embodiment, the steps of method 700 are performed by ODCR ML anomaly detector for assets with random downtimes 140 (as shown and described with reference to FIG. 1). In one embodiment, ODCR ML anomaly detector for assets with random downtimes 140 is a special purpose computing device (such as computing device 1305) configured with ODCR ML anomaly detection for assets with random downtimes logic 1330. In one embodiment, ODCR ML anomaly detector for assets with random downtimes 140 is a module of a special purpose computing device configured with logic 1330.

Method 700 may be initiated automatically based on various triggers, such as in response to receiving a signal over a network or parsing stored data indicating that (i) a user (or administrator) of time series data service 105 has initiated method 700, (ii) that that method 700 is scheduled to be initiated at defined times or time intervals, or (iii) that sensor interface server 150 is receiving or has begun receiving time series signal data from sensors 120, 130. The method 7000 initiates at START block 705 in response to parsing a signal received or stored data retrieved and determining that the signal or stored data indicates that the method 700 should begin.

The algorithm of method 700 begins at start block 705 by picking a signal (from possibly many signals) from which it can be inferred that an asset is in its "on-duty-cycle" operation versus "off-duty-cycle" operation. For example, for utility generation assets there is typically a power metric called "MW generated" that has a positive value when the plant and assets are "up" and has a zero value when the plant and associated assets are "down". When the "MW generated" metric is zero, all telemetry metrics drop to ambient levels. Similarly, for home appliances there is typically an "input current, I" (measured by a current sensor in units of Amps, mA, etc.) that serves to indicate up-time versus down-time. In one embodiment, picking the metric for inference of off-duty-cycle operation may be accepting and storing a selection during initial configuration or setup of the systems and methods described herein. The data scientist performing the initial configuration should know—based on his domain knowledge—what form of signal from a sensor indicates an asset is operational, and what form of signal from a sensor indicates an asset is quiescent or off-duty. For example, a sensed electric current may indicate an asset is "on-duty," while a sensed absence of electric current may indicate the asset is "off-duty." Initial configuration may accept and store the significances of such sensor indications.

Figure 8:
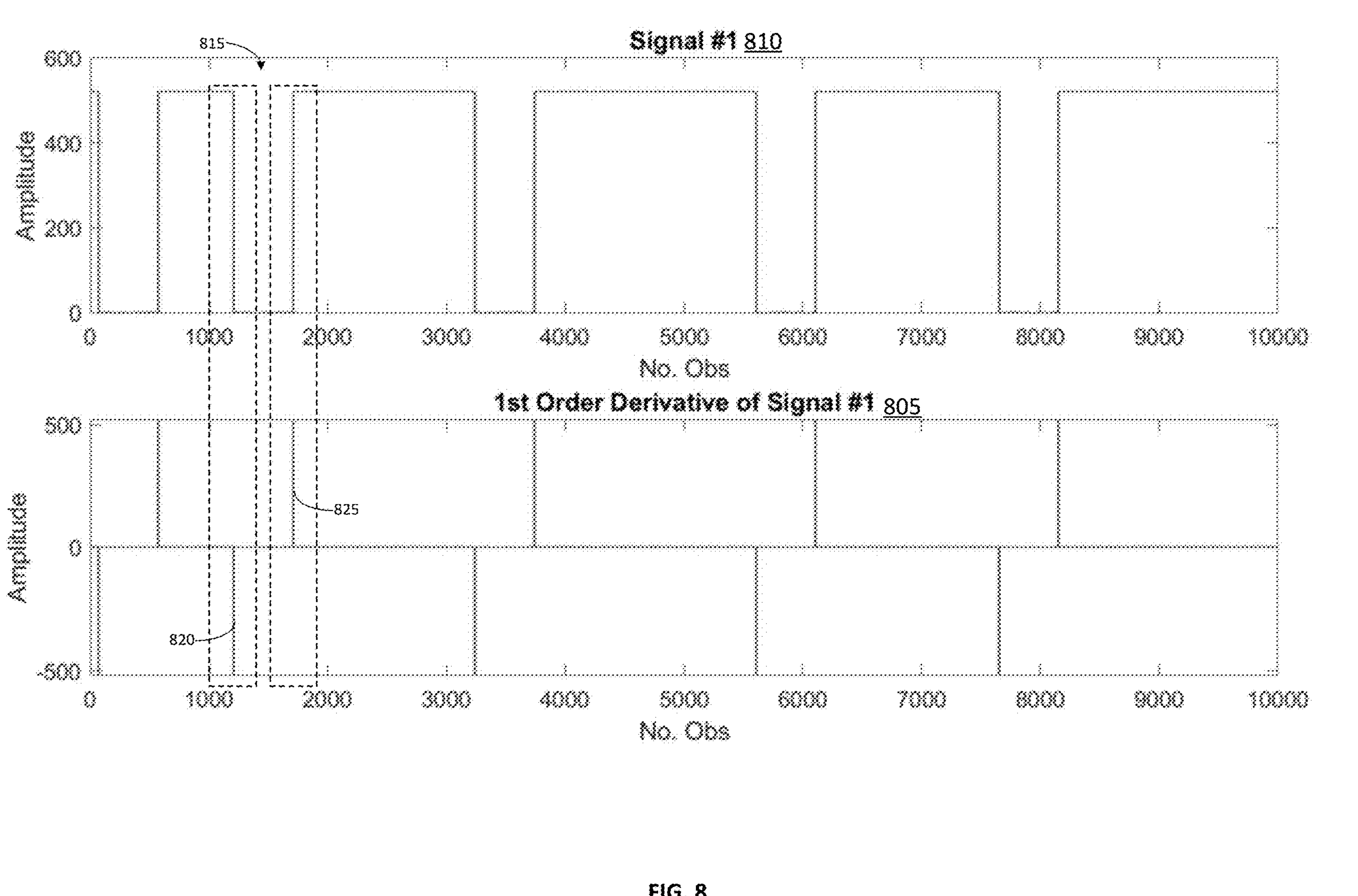
FIG. 8 illustrates a numerical derivative of one signal of a time signal database that indicates when downtime cycles occur.

At process block 710 of method 700, the system uses the numerical derivative ($1^{st}$ order differential) of the signals to determine where the downtime cycles occur. The resulting derivative signal contains spikes at the location of the discontinuities (as shown in FIG. 8) generated by the shift in the downtime mean in the original signal. A spike in the numerical derivative (in particular a first order differential) of the time signal that indicates a transition to asset downtime, or to asset uptime, may be detected as discussed herein.

In one embodiment, the indices of the negative spikes are the beginning of the downtime while the positive spikes indicate the end of the downtime. Note that, while the example operational metric (or signal) used to infer "on-duty-cycle" operation versus "off-duty-cycle" operation is positive when the asset is operational, it is also possible in some use cases that the operational metric used to infer "on-duty-cycle" operation versus "off-duty-cycle" operation could be negative (or have a signal amplitude below zero) when the asset is operational. In such cases, the significance of the numerical derivative spikes indicating transition from one duty cycle state to another should simply be reversed for any use cases involving a negative operational metric. In one embodiment, the assignment of the significance of positive or negative spikes is selected (as mentioned above) during initial configuration of the systems and methods described herein by indicating whether relatively higher or lower values of received signal indicate operation of the asset. In this configuration, a positive first order derivative spike indicates commencement of an on-duty cycle when higher signal amplitude indicates operation, and a negative first order derivative spike indicates commencement of an on-duty cycle when lower signal amplitude indicates operation. In one embodiment, the system can automatically infer whether higher or lower signal amplitude of a particular signal indicates operation, for example, by determining whether that signal is higher or lower when (i) an input power signal is in a relatively higher amplitude state, or (ii) the majority of other signals are in relatively higher amplitude states.

Referring briefly to FIG. 8 for an illustrative example, FIG. 8 illustrates 800 a first order numerical derivative 805 of Signal No. 1 810 of a time signal database that indicates when downtime cycles occur. Signal No. 1 810 includes downtime cycles, such as example downtime (off-duty) cycle 815, beginning at approximately observation 1200 and ending at approximately observation 1700. Numerical derivative 805 corresponds to signal 810. Negative first order derivative spike 820 corresponds to and is contemporaneous with the onset of example downtime cycle 815. Positive first order derivative spike 825 corresponds to and is contemporaneous with the termination of example downtime cycle 815 and commencement of an on-duty cycle. Thus in one embodiment, negative first order derivative spike 820 (and other spikes like it) indicates shut-down to an off-duty cycle of an asset monitored with Signal No. 1 810, and positive first order derivative spike 825 (and other spikes like it) indicates start-up to an on-duty cycle of the asset.

Referring again to FIG. 7, at process block 715, the system chooses the signal for which its corresponding numerical derivative has the maximum standard deviation. The standard deviation is a measure of how far a signal fluctuates from the signal's mean or average value. This signal is chosen because it produces the "loudest" spikes when the system transitions from one duty cycle to another.

At process block 720, the system infers onset of asset downtime from indices of negative spikes and infers initiation of operational time from indices of positive spikes. (Or alternatively, where the operational metric signal is negative when the asset is operational, the system infers onset of asset downtime from indices of positive spikes and infers initiation of operational time from indices of negative spikes). More generally, they system may infer ranges of asset downtime from spikes in a numerical derivative (such as a first order derivative) of a time series signal for an asset.

In one embodiment, these spike indices in the first order numerical derivative are detected and characterized by a spike detection/definition technique. One suitable spike detection/definition technique is to make an initial guess at an optimal damping factor value, extract identified spikes from the original (numerical derivative) signal to create a despiked signal, identify the characteristic metrics of the identified spikes (heights, widths, inter-arrival times), identify a range of 10% on either side of these characteristic metrics, generate "ground truth" spikes by sampling from within the range, and seed the despiked signal with the "ground truth" spikes to produce a "ground truth" signal, optimize the damping factor value as a function of spike height, width, and inter-arrival times, and perform spike detection again on the original (numerical derivative) signal using the optimized damping factor value to detect the spike indices in the numerical derivative signal. This spike detection/definition technique is described in further detail in U.S. patent application Ser. No. 16/215,345, entitled "Synthesizing High-Fidelity Signals with Spikes for Prognostic-Surveillance Applications" by inventors Guang C. Wang and Kenny C. Gross, filed Dec. 10, 2018, the entirety of which is incorporated herein by reference. Other spike detection/definition techniques may also be suitable.

At process block 725, the system parses the original signal with the indices and appends portions between indices together to generate the downtime signal. In one embodiment, the system retrieves a first observation number (or other indicator of position within the signal) at which a spike index indicating the onset of downtime (off-duty) for the asset occurs in the numerical derivative of the signal. The system then retrieves a second observation number at which the next (that is, immediately subsequent to the first observation number) spike index indicating the onset of uptime (on-duty) for the asset occurs in the numerical derivative of the signal. The system then extracts or copies the portion or segment of the signal extending from the first observation number to the second observation number, and appends or concatenates that portion of the signal to an asset downtime signal. The process then repeats for the next (that is, immediately subsequent to the second observation number) spike index indicating the onset of downtime, until no further spike indices indicating the onset of downtime are present in the signal, and the downtime signal is complete. In this manner, an asset downtime signal may be extracted from the time series signal based on the inferred ranges of asset downtime.

Signal may be extracted and concatenated, especially during a training phase, or monitored live, especially in a surveillance phase of operation, once MSET models are trained. In a surveillance phase, in response to detection of a spike that indicates a transition to asset downtime, the system monitors the time series signal for anomalous activity with the trained machine learning model trained on asset downtime signal where the downtime signal is dynamic, or with SPRT alone where the downtime signal is static, stochastic activity. In the surveillance phase, in response to detection of a spike that indicates a transition to asset uptime, the system monitors the time series signal for anomalous activity with the trained machine learning model trained on asset uptime signal.

The system then checks the variance of (or the power of fluctuations in) the asset downtime signal. At decision block 730, the system determines whether the variance of the asset downtime signal is 0 or not. A variance of 0 indicates a "no-telemetry" downtime in which no time-series signal data is received from the asset when the asset is off-duty. Where the variance is 0, the system proceeds to process block 735. A variance that is not 0 indicates a "non-active with telemetry" downtime in which time series signal data continues to be received from the asset even while the asset is off duty. Where the variance is non-zero, the system proceeds to decision block 740. In this manner, the system may determine that the asset downtime signal carries telemetry based on the variance of the asset downtime signal.

At process block 735, the system removes the downtime sections of the original signals. The downtime sections are deleted, and uptime sections bracketing the deleted sections are concatenated to close up the gap. In one embodiment, this occurs at the same time as the creation of the downtime signal by deleting from the signal each downtime portion of the signal in turn as it is appended to the downtime signal, and reducing the observation index numbers of the subsequent signal by the length of the deleted portion. In another embodiment, the uptime sections are retrieved and concatenated in a similar manner to the downtime sections. For example, the system retrieves a first observation number (or other indicator of position within the signal) at which a spike index indicating the onset of uptime (on-duty) for the asset occurs in the numerical derivative of the signal. The system then retrieves a second observation number at which the next (that is, immediately subsequent to the first observation number) spike index indicating the onset of downtime (off-duty) for the asset occurs in the numerical derivative of the signal. The system then extracts or copies the portion or segment of the signal extending from the first observation number to the second observation number, and appends that portion of the signal to an asset uptime signal. The process then repeats for the next (that is, immediately subsequent to the second observation number) spike index indicating the onset of uptime, until no further spike indices indicating the onset of uptime are present in the signal, and the concatenated asset uptime signal is complete. In this manner, an asset uptime signal may be extracted from the time series signal based on the inferred ranges of asset uptime.

At process block 745, the system trains an MSET model with the concatenated uptime signals, exclusive of the downtime signals. At process block 750, the system monitors concatenated uptime signals, exclusive of the downtime signals, with the MSET model trained for uptime data signals. The monitoring may proceed indefinitely, pausing when downtime data signals are received, until uptime signals are again received. Following process block 750, the process 700 then either ends or repeats from start block 705.

Where the variance was determined to be non-0 at decision block 730, the system proceeds from decision block 740. At decision block 740, the system checks to see if the downtime signals are ambient "white" noise, or more formally, whether the downtime signals represent stationary stochastic background activity or not. In one embodiment, this may be determined by a "whiteness" test. One suitable whiteness test is a light-weight (in terms of required compute resources) but high-fidelity whiteness test called the "Two-Tail Run-of-Signs Test" that has wide applicability to IoT industrial transducer time-series signatures. This test is described in greater detail in "Spectral Decomposition and Reconstruction of Nuclear Plant Signals," K. K. Hoyer and K. C. Gross, Proc. 18th SAS Users group Intnl. Conf., pp 1153-1158, New York, NY (May 9-12, 1993). A run is a set of residuals all having the same sign (+ or −), bracketed on either end by a residual having the opposite sign. The run-of-signs test determines the total number of runs in the residual function and compares that to each of (i) the number of individual positive residuals ($N_1$), (ii) the number of individual negative residuals ($N_2$), and (iii) the total number of individual residuals (both positive and negative) ($N_T$). Where (i) the number of individual positive residuals ($N_1$) is approximately equal to the number of individual negative residuals ($N_2$), and (ii) the number of runs ($N_R$) is given by $$N_R \approx \frac{2N_1N_2}{N_T+1} \quad \text{Eq. 1}$$

the activity in the downtime signals act is white noise. White noise, or stationary stochastic background activity (in which signal values do not change drastically over time) represents a steady state of the asset during the "off-duty" cycle. If the downtime signals are "white" (represent stationary stochastic process), the system proceeds to process block 755. If the downtime signals are not "white," the system proceeds to process block 760.

At process block 755, the system parses remaining signals to generate a downtime signal database and analyzes the downtime signals with SPRT to detect anomalies. In one embodiment, for each observation in the sequence of observations in the downtime signal database, the processor checks the value of the signal at that observation by the SPRT, and labels or flags the value as either anomalous—for example by SPRT rejecting the null hypothesis in favor of the alternative hypothesis—or not anomalous—for example by either retaining the null hypothesis or by not reaching a conclusion regarding the null hypothesis or alternative hypothesis. At decision block 765, the system determines if any anomalies were found by SPRT. In one embodiment, the processor retrieves and checks the label or flag applied at block 755 for each observation until an "anomalous" label is detected, or until the labels for each observation have been retrieved and checked, and no "anomalous" labels were found. If no anomalies are detected, then the system proceeds to process block 770. If anomalies are detected, then the system proceeds to process block 775. An anomaly may indicate the presence of dynamic activity, which is not stationary stochastic background activity. At process block 770, the system records that no anomalies were detected during downtime. Following process block 770, the process 700 then either ends or repeats from start block 705. At process block 775, the system actuates alerts for anomalies during downtime.

Where the downtime signals were determined not to be white noise in decision block 740, the system proceeds from process block 760. At process block 760, the system registers that the downtime signatures are dynamic (not stationary). At process block 780, the system sets the number of vectors in MSET to maximum, for example 2500 vectors. This is the number of vectors used to train the MSET model. At process block 785, the system trains an MSET model with the original downtime data (that is, the MSET model is trained with the downtime data that is removed at process block 735). The MSET machine learning model is trained for the asset downtime signal by retrieving the concatenated downtime signal from memory or storage, and automatically generates a function to predict correct behavior of the asset given the input asset downtime signal. At process block 790, the system monitors sensor data with the MSET model trained for downtime data signals. The monitoring may proceed indefinitely. Following process block 790, the process 700 then either ends or repeats from start block 705.

In one embodiment, alert conditions occurring during any type of duty signal may be presented to other parts of the system in order to cause predictive maintenance of the monitored asset to occur. For example, in response to detecting anomalous activity in the asset downtime signal, the system may present an alert for display on a graphical user interface. The displayed alert may include information about the monitored asset and the cause of the alert. These alerts may be preconfigured and stored for retrieval when the specific failure conditions monitored by the ODCR ML system occur. In another example, in response to detecting anomalous activity in the asset downtime signal, the system may send a command indicating a corrective action to a computer system that controls the operation of the monitored asset, which will adjust operation of the monitored asset accordingly.

Thus, the system automatically handles the three different cases for off-duty cycle signal data—no telemetry, non-active with telemetry on stationary background, and non-active with telemetry on dynamic background—by identifying the transitions into and out of the off-duty cycle, and conditionally substituting different machine learning situations and models for both training and monitoring based on the case. For example, while an asset is detected to be on-duty, a first MSET model is trained or used for monitoring. When the asset is detected to be off-duty, if there is no telemetry, the downtime signal data is disregarded, and the first MSET model is not provided with the downtime signal data. When the asset is detected to be off duty, but sending dynamic (e.g. cool-down) signals a second MSET model is used for training with or monitoring the dynamic signals. When the asset is detected to be off-duty, and sending white noise signals, the white noise signals are monitored for anomalies—dynamic signals. If anomalies are detected, another (for example, the second) MSET model is used for training with or monitoring the detected anomalous dynamic signals.

Performance of Example System

Figure 9:
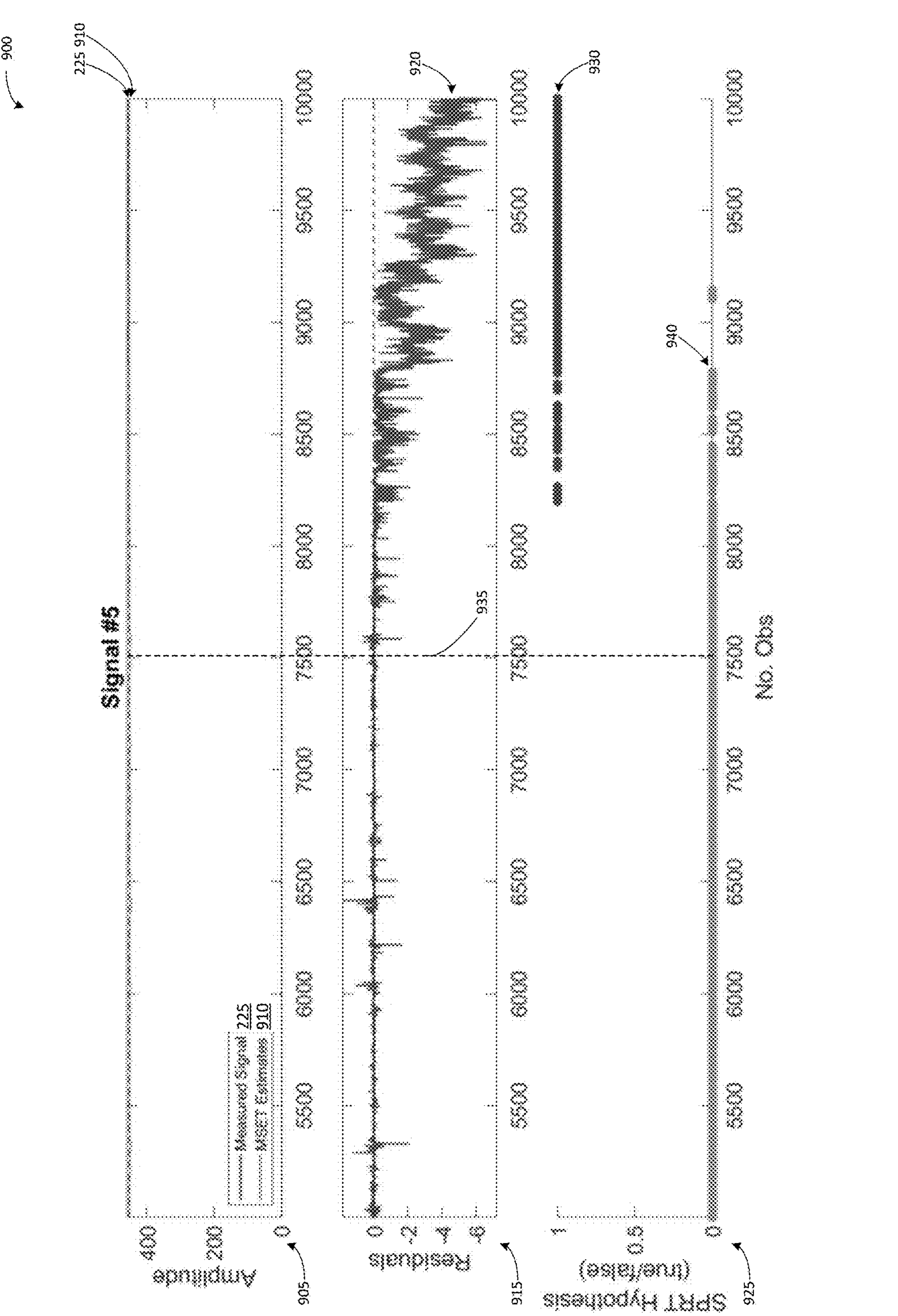
FIG. 9 displays results from monitoring the database where downtime signals are confined to the training portion of the time signal.
Figure 10:
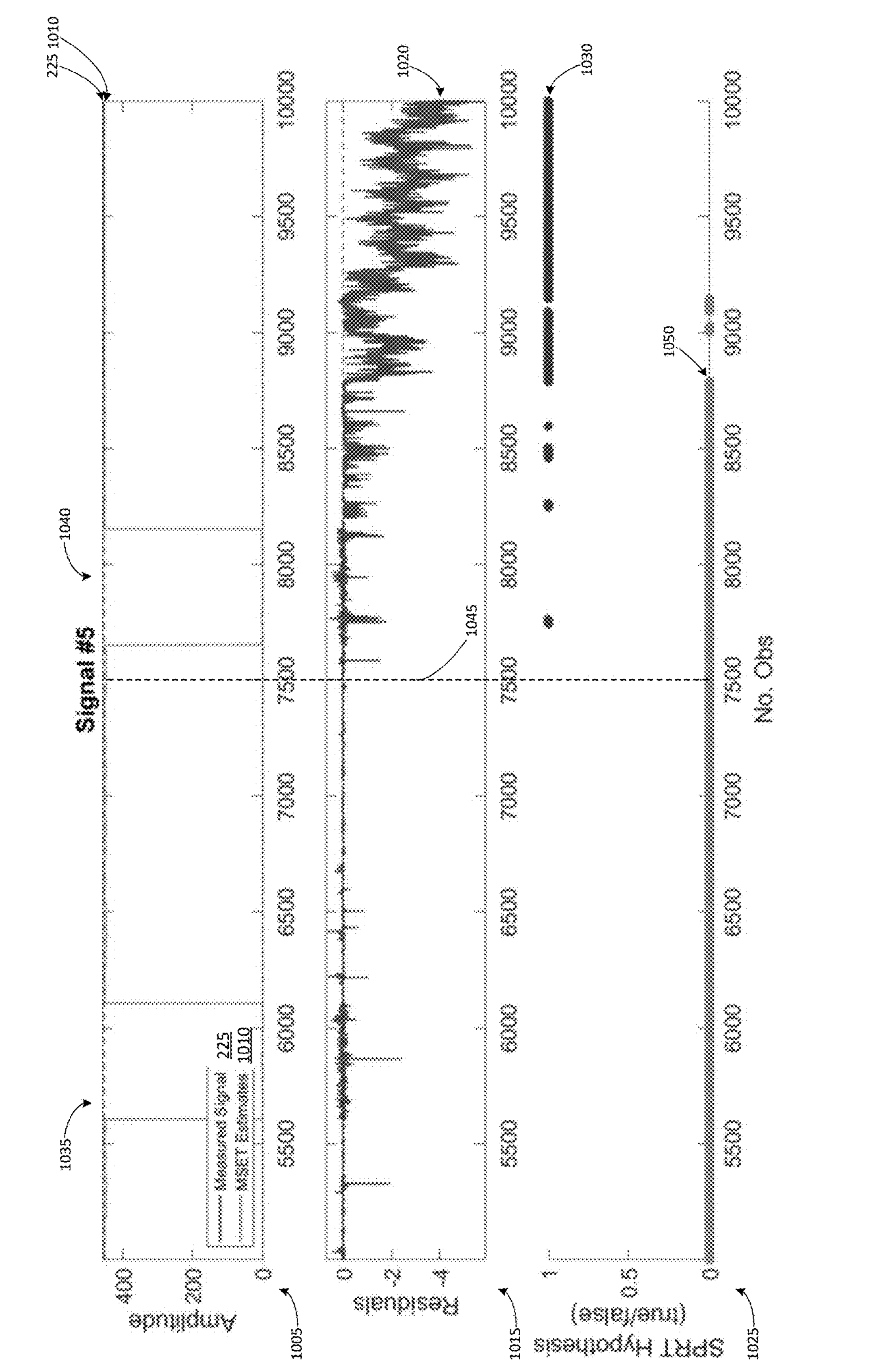
FIG. 10 displays results from monitoring the database where downtime signals are dispersed to both a training portion and a surveillance portion of the time signal.

FIGS. 9 and 10 show an example of operation of ODCR ML prognostics on time series signals for discontinuously operating assets (which have both on-duty and off-duty cycles). FIGS. 9 and 10 show the effectiveness of the ODCR ML systems and methods described herein. FIG. 9 displays results from monitoring the database where the downtime cycles are isolated to the training portion of the signal, for example as shown in FIG. 5 above. FIG. 10 displays results from monitoring the database where downtime signals are dispersed to both a training portion and a surveillance portion of the time signal. In this combination state, downtimes occur in both the training and surveillance portion, as shown in FIG. 6 above. In both cases the degradation in Signal #5 is detected with similar accuracy to the ordinary cases shown in FIGS. 2-4 (in which no downtimes occur) while MSET is simultaneously predicting and accounting for the downtime modes.

FIG. 9 illustrates plots 900 of aspects of application of ODCR ML prognostics to Signal No. 5 225, which is undergoing the slow, drifting degradation mode discussed herein. In FIG. 9, cycles between on-duty and off-duty asset operation in Signal No. 5 225 are confined to the training portion—before observation 5000—of the data, as shown and described with reference to FIG. 5. The MSET model monitoring Signal No. 5 is trained in the training portion based on observations of Signal No. 5 during on-duty operation, with observations during off-duty operation detected and excluded from training by the ODCR ML features discussed herein. The plots 900 include three subplots: first subplot 905 showing monitored signal (Signal No. 5 225) compared to the corresponding MSET estimates 910, second subplot 915 showing the resulting residuals 920 between the model-predicted (MSET-estimated) and monitored signals, and third subplot 925 showing the Sequential Probability Ratio Test (SPRT) alarms 930 triggered by the degradation in Signal No. 5 225. Plots 900 extend over the second 5000 observations (Obs. Nos 5001-10000) of Signal No. 5 225, which is the surveillance portion of the time signal data. The signal begins to undergo the slow, drifting degradation mode beginning at observation 7500 935. As the magnitude of residuals 920 increases, the SPRT hypothesis begins to shift, on an observation-by-observation basis, from a false, no alarm state 940 to a true, alarm state 930. Thus, the ODCR ML performs satisfactorily even though it was trained on time signal data interrupted by off-duty cycle intervals.

FIG. 10 illustrates plots 1000 of aspects of application of ODCR ML prognostics to Signal No. 5 225, which is undergoing the slow, drifting degradation mode. The plots 1000 include three subplots: first subplot 1005 showing the MSET estimates 1010 compared to the monitored signal (Signal No. 5 225); second subplot 1015 showing the resulting residuals 1020 between the model-predicted signal 1010 and the monitored signal (Signal No. 5 225), and third subplot 1025 showing the SPRT alarms 1030 triggered by the signal degradation. In FIG. 10, cycles between on-duty and off-duty asset operation in Signal No. 5 225 are present in both a training portion—before observation 5000—and a surveillance portion—after observation 5000—of the time series data, as shown and described with reference to FIG. 6. As shown, there are two off-duty or downtime cycles, first off-duty cycle 1035 beginning at approximately observation 5600 and ending at approximately observation 6100, and second off duty cycle 1040 beginning at approximately observation 7700 and ending at approximately observation 8200. The signal begins to undergo the slow, drifting degradation mode beginning at observation 7500 1045. As the magnitude of residuals 1020 increases, the SPRT hypothesis begins to shift, on an observation-by-observation basis, from a false, no alarm state 1050 to a true, alarm state 1030.

During the surveillance portion, the OCDR ML switches between monitoring systems in response to operation changes of the asset from on-duty to off-duty cycle, or from off-duty to on-duty cycle. A first MSET model monitors on-duty cycle operation in Signal No. 5 225. This first MSET model monitoring the on-duty cycle operation is trained in the training portion based on observations of Signal No. 5 225 during on-duty operation, with observations during off-duty operation detected and excluded from training by the ODCR ML features discussed herein. Dynamic off-duty cycle activity in Signal No. 5 225 is monitored by a second MSET model. This second MSET model monitoring dynamic off-duty cycle operation is trained in the training portion based on observations of Signal No. 5 225 during off-duty operation, with observations during on-duty operation detected and excluded from training by the ODCR ML features discussed herein. Static, stochastic off-duty cycle activity in Signal No. 5 225 is monitored by SPRT. The processor determines whether to use the second MSET model or SPRT for monitoring based on whether the off-duty cycle activity in Signal 5 225 is dynamic or static, stochastic activity. The switch occurs seamlessly, causing no SPRT alerts in response to the transition from on-duty cycle to off-duty cycle, or from off-duty cycle to on-duty cycle, as can be seen in third subplot 1025 at observations 5600-6100 (corresponding to first off-duty cycle 1035) and at observations 7700-8200 (corresponding to second off duty cycle 1040). Thus, the ODCR ML performs satisfactorily even though it was trained on time signal data interrupted by off-duty cycle intervals and the time signal under surveillance includes further off-duty cycle interruptions.

Cooldown and Initial Inertia

Figure 11:
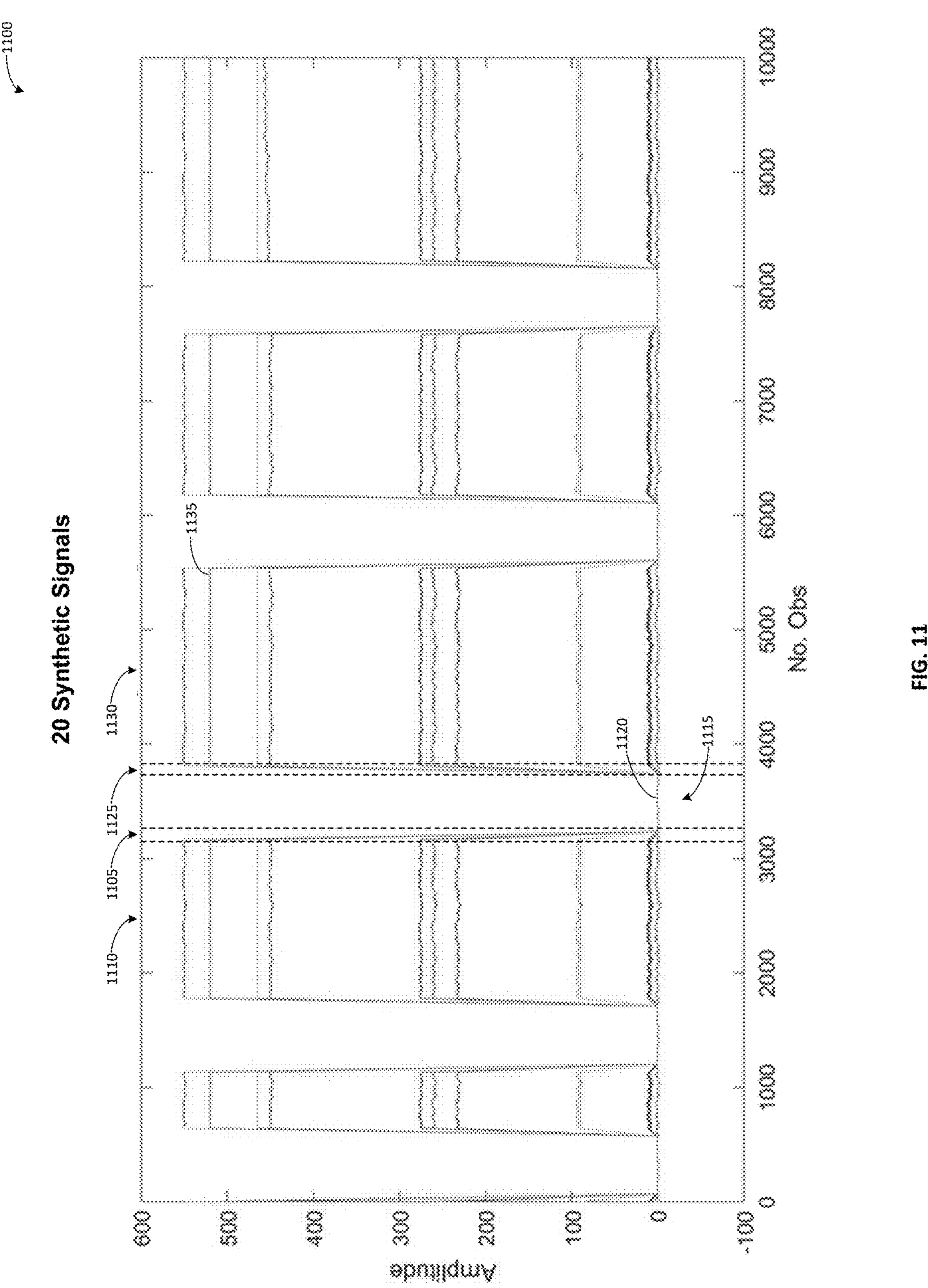
FIG. 11 illustrates a synthesized example time signal database with twenty signals that mimics an asset in the utility industry that exhibits cooldown times and startup inertia.

FIG. 11 illustrates a synthesized example time signal database 1100 with twenty signals that mimics an asset in the utility industry that exhibits cooldown times—periods during which signal amplitude gradually transitions from an on-duty state to an off-duty state—and startup inertia—periods during which amplitude gradually transitions from an off-duty state to an on-duty state. The dispersion of signals with cooldown times and startup inertia is shown. Cooldown times can be seen in signal slopes (over multiple observations) between operating amplitude and 0 amplitude. One example cooldown period 1105 begins at approximately observation 3100 when an on-duty cycle 1110 of the asset ends (and an off-duty cycle 1115 begins) and continues to observation 3200, when off-duty activity of the asset transitions from the dynamic cooldown activity to static, stochastic behavior, such as static, stochastic state 1120. Initial inertia or warmup times can be seen in the slopes (over multiple observations) between 0 amplitude and operating amplitude. One example initial inertia period 1125 begins at approximately observation 3700 when off-duty cycle 1115 of the asset ends (and a subsequent on-duty cycle 1130 begins) and continues to observation 3800, when the initial inertia activity of the asset transitions to a steady on-duty operating state, such as steady on-duty operating state 1135. In this example, each signal in signal database 1100 exhibits both initial inertia and cooldown activity. In another example, some signals may exhibit initial inertia but not cooldown activity, some signals may exhibit cooldown activity but not initial inertia, some signals may exhibit neither initial inertia nor cooldown activity, and some signals may exhibit both initial inertia and cooldown activity. Further, while the signals of signal database 1100 have initial inertia and cooldown activity periods that are uniform across all signals, in another example, these periods need not be the same for all signals. The ODCR ML discussed herein accommodates each of these variations without suffering in performance.

Figure 12:
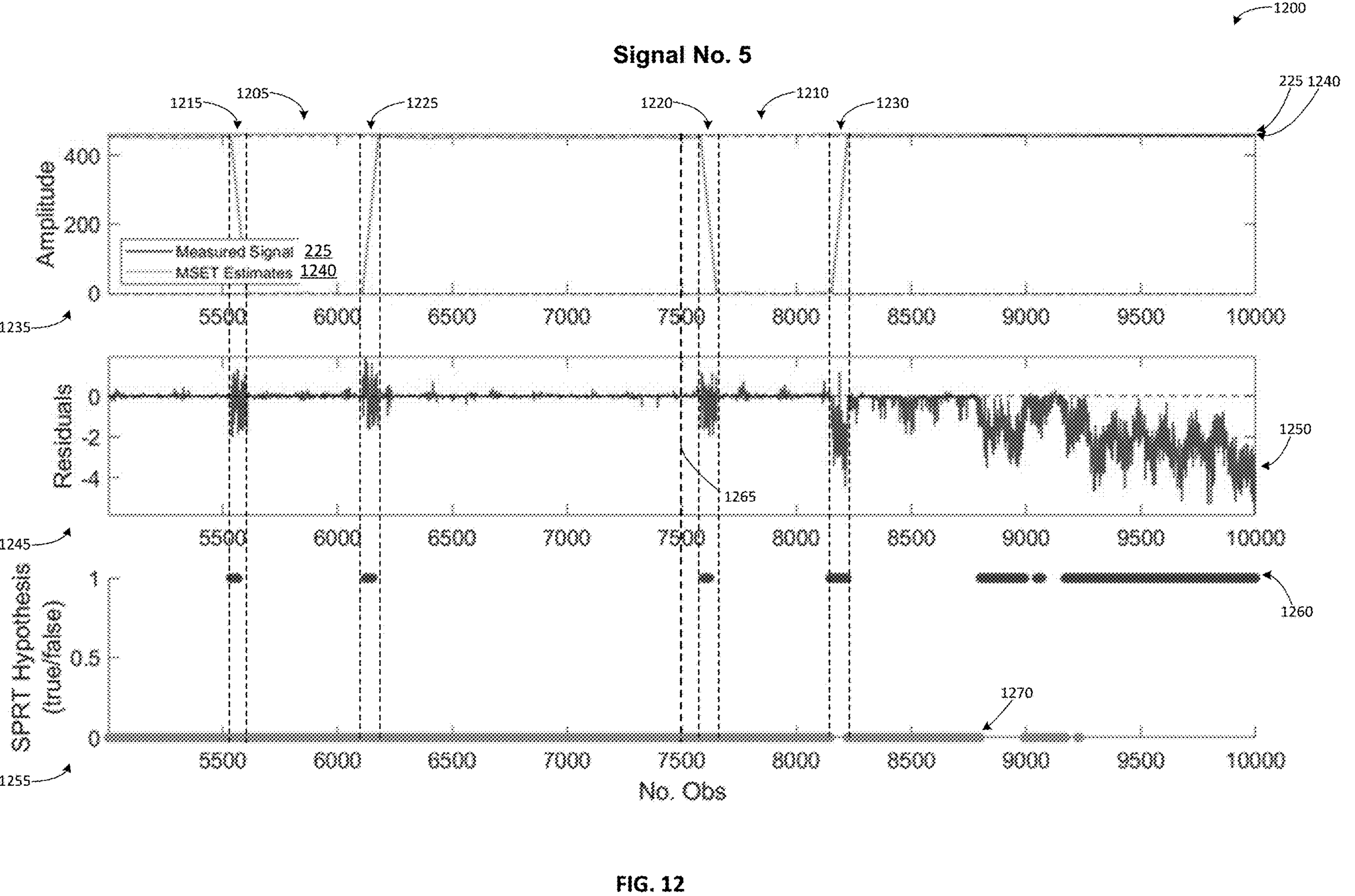
FIG. 12 displays results from monitoring the database where downtime signals for an asset exhibiting cooldown periods and startup inertia are dispersed to both a training portion and a surveillance portion of the time signal.

FIG. 12 displays results from monitoring the database where downtime signals for an asset exhibiting cooldown periods and startup inertia are dispersed to both a training portion and a surveillance portion of the time signal. In particular, FIG. 12 illustrates plots 1200 of aspects of application of ODCR ML prognostic monitoring to Signal No. 5 225, which is undergoing the slow, drifting degradation mode. In the synthetic signal (Signal No. 5 225) there are random downtimes (such as first off-duty cycle 1205 and second off-duty cycle 1210) which contain dynamics. The downtimes in the signal 225 are preceded by a cooldown period (such as first cooldown period 1215 and second cooldown period 1220) and followed by a startup inertia period (such as first startup inertia period 1225 and second startup inertia period 1230). Both the cooldown periods 1215, 1220 and the startup periods 1225, 1230 are 70 observations long and are generated by adding ramps to the synthetic signal.

The plots 1200 include three subplots, first subplot 1235 shows the MSET estimates 1240 compared to the monitored signal (Signal No. 5 225); second subplot 1245 showing the resulting residuals 1250 between the model-predicted signal and the monitored signal 1240; and third subplot 1255 showing the SPRT alarms 1260 triggered by the degradation in the measured signal 225. The signal begins to undergo the slow, drifting degradation mode beginning at observation 7500 1265. As the magnitude of residuals 1250 increases, the SPRT hypothesis begins to shift, on an observation-by-observation basis, from a false, no alarm state 1270 to a true, alarm state 1260.

In one embodiment, dedicated MSET models are trained and used in surveillance of the signal for cooldown periods and startup inertia periods. Where initiation of an off-duty cycle is detected, the ODCR ML automatically switches from monitoring with the on-duty cycle model to monitoring with the dynamic off-duty cycle model or dedicated cooldown model, until static, stochastic activity is detected, where the OCDR then automatically switches to SPRT monitoring. Where initiation of an on-duty cycle is detected, the ODCR ML automatically switches from monitoring with the SPRT or dynamic off-duty model to monitoring with a dedicated startup inertial (or warmup) model until steady state activity is reached.

In both FIGS. 10 and 12, the maximum number of vectors for the MSET results shown is 2500. Compare FIG. 12 with FIG. 10, in which the asset does not exhibit cooldown periods and startup inertia, but in both figures, signal degradation in Signal No. 5 225 begins to occur at observation 7500 (due to the inserted ramp shown in FIG. 3). FIG. 12 further shows the effectiveness of the systems and methods described herein. Even with the cooldown periods and startup inertia, the degradation in Signal #5 is detected with similar accuracy to the ordinary cases shown in FIGS. 2-4 (in which no downtimes occur) while MSET is simultaneously predicting and accounting for the downtime modes.

The systems and methods described herein thus enable robust ML prognostic functionality for widespread industrial use cases where assets can have random Off-Duty cycle operability. The ODCR ML systems and methods described herein are robust in monitoring mixed on- and off-duty cycle operation and are not caused to fail or present false or missed alerts when monitoring a transition from one duty state to another. Moreover, the systems and methods described herein enable time series signal data to be monitored while automatically handling off-duty cycle (downtime) signals in real time, simultaneously with the ML model predictions. Advantageously, the systems and methods described herein offers these improvements without requiring hardware upgrades to the sensors or assets, or to the data archive of a business entity implementing the systems or methods described herein due at least to the automated spike detection employed. The systems and methods described herein are therefore immediately backward compatible with any existing on-premises or cloud implementation of IoT asset monitoring.

The systems and methods described herein extend the range of applicability for time-series prognostics to include high-fidelity prognostic functionality for customer assets that temporal distribution of "On/Off Duty Cycle Operational Modes" that heretofore has been not feasible by conventional monitoring approaches. Generally, any IoT cloud operations where customers analyze large-scale time series databases for machine learning prognostics may be improved by implementing the systems and methods described herein for off-duty-cycle-robust machine learning for anomaly detection in assets with random downtimes, including, for example GE PREDIX, Microsoft Azure, Amazon AWS_Sitewise, SAP/Siemens Intelligent Asset Management.

Selected Embodiments

In one embodiment, a computer-implemented method includes inferring ranges of asset downtime from spikes in a numerical derivative of a time series signal for an asset; extracting an asset downtime signal from the time series signal based on the inferred ranges of asset downtime; determining that the asset downtime signal carries telemetry based on the variance of the asset downtime signal; training a first machine learning model for the asset downtime signal; detecting a first spike in the numerical derivative of the time signal that indicates a transition to asset downtime; and in response to detection of the first spike, monitoring the time series signal for anomalous activity with the trained first machine learning model. In one embodiment, the method further includes inferring ranges of asset uptime from the spikes in the numerical derivative of the time series signal for the asset; extracting an asset uptime signal from the time series signal based on the inferred ranges of asset uptime; training a second machine learning model for the asset uptime signal; detecting a second spike in the numerical derivative of the time signal that indicates a transition to asset uptime; and in response to detection of the second spike, monitoring the time series signal for anomalous activity with the trained second machine learning model. In one embodiment, the method further includes, in response to the determination that the asset downtime signal carries telemetry, determining that the asset downtime signal is stationary stochastic background activity; analyzing the asset downtime signal to detect anomalies using a sequential probability ratio test; and in response to detection of anomalous dynamic background activity, monitoring the time series signal with the first trained machine learning model, wherein the trained first machine learning model is trained with normal dynamic background activity. In one embodiment, the method further includes, in response to the determination that the asset downtime signal carries telemetry, determining that the asset downtime signal is dynamic background activity; and monitoring the time series signal with the first trained machine learning model, wherein the trained first machine learning model is trained with normal dynamic background activity. In one embodiment, the method further includes, in response to the determination that the asset downtime signal carries telemetry, determining that the asset downtime signal is dynamic background activity that transitions to stationary stochastic background activity; monitoring the time series signal with the trained first machine learning model until the time series signal transitions from dynamic background activity to stationary stochastic background activity, wherein the trained first machine learning model is trained with normal dynamic background activity; and in response to the transition to the stationary stochastic background activity, monitor the time series signal using a sequential probability ratio test to detect anomalies; and in response to detection of an anomalous dynamic background activity in the stationary stochastic background activity; resume monitoring the time series signal with the trained first machine learning model. In one embodiment, onset of asset downtime is inferred from spikes of a first direction in the numerical derivative and initiation of asset operational time is inferred from spikes of a second direction opposite the first direction in the numerical derivative. In one embodiment, onset of asset downtime is inferred from negative spikes in the numerical derivative and initiation of asset uptime is inferred from positive spikes in the numerical derivative. In one embodiment, onset of asset downtime is inferred from positive spikes in the numerical derivative and initiation of asset uptime is inferred from negative spikes in the numerical derivative. In one embodiment, the first machine learning model is a multivariate state estimation technique model. In one embodiment, the method further includes, in response to detecting anomalous activity in the asset downtime signal, presenting an alert for display on a graphical user interface. In one embodiment, the method further includes automatically concatenating the inferred asset downtime portions of the time series signal to form the asset downtime signal, or automatically concatenating the inferred asset uptime portions of the time series signal to form the asset uptime signal. In one embodiment, the method further includes automatically selecting the time series signal for the asset from among other time series signals for the asset based on a value of a standard deviation of the numerical derivative of the time series signal. In one embodiment, computer-readable instructions are stored on a non-transitory computer readable medium that, when executed by the processor of a computer in concert with other components of the computer as needed, cause the computer to execute the method. In one embodiment, a computing system including a processor, memory, and a computer readable medium storing computer-readable instructions that, when executed by computing system, cause the computer to execute the method.

In one embodiment, a computer-implemented method includes inferring asset downtime from spikes in a numerical derivative of a time series signal that monitors the asset; extracting an asset downtime signal from the time series signal based on the inferred asset downtime; determining whether the asset downtime signal carries telemetry by checking whether the variance of the downtime signal is not 0; training a machine learning model for the asset downtime signal; and monitoring the asset downtime signal with the trained machine learning model. In one embodiment, the method further includes in response to determining that the asset downtime signal carries telemetry, determining that the asset downtime signal is stationary stochastic background activity; analyzing the asset downtime signal to detect anomalies; and in response to detecting an anomalous dynamic background activity, monitoring the asset downtime signal with the trained machine learning model, wherein the trained machine learning model is trained with dynamic background activity. In one embodiment, the method further includes in response to determining the asset downtime signal carries telemetry, determining that the asset downtime signal is dynamic background activity; and monitoring the asset downtime signal with the trained machine learning model, wherein the trained machine learning model is trained with dynamic background activity. In one embodiment, the method further includes discarding asset downtime by automatically concatenating portions of the time series signal outside of the inferred asset downtime. In one embodiment of the method, onset of asset downtime is inferred from negative spikes in the numerical derivative and initiation of asset operational time is inferred from positive spikes in the numerical derivative. In one embodiment of the method, onset of asset downtime is inferred from positive spikes in the numerical derivative and initiation of asset operational time is inferred from negative spikes in the numerical derivative. In one embodiment, the method further includes in response to determining the asset downtime signal carries telemetry, determining that the asset downtime signal is dynamic background activity; monitoring the dynamic background activity with the trained machine learning model until the asset downtime signal transitions from dynamic background activity to stationary stochastic background activity; and monitoring the stationary stochastic background activity with a sequential probability ratio test to detect any anomalous dynamic background activity. In one embodiment of the method, the machine learning model is a Multivariate State Estimation Technique model. In one embodiment, computer-readable instructions are stored on a non-transitory computer readable medium that, when executed by the processor of a computer in concert with other components of the computer as needed, cause the computer to execute the method. In one embodiment, a computing system including a processor, memory, and a computer readable medium storing computer-readable instructions that, when executed by computing system, cause the computer to execute the method.

Computing Device Embodiments

Figure 13:
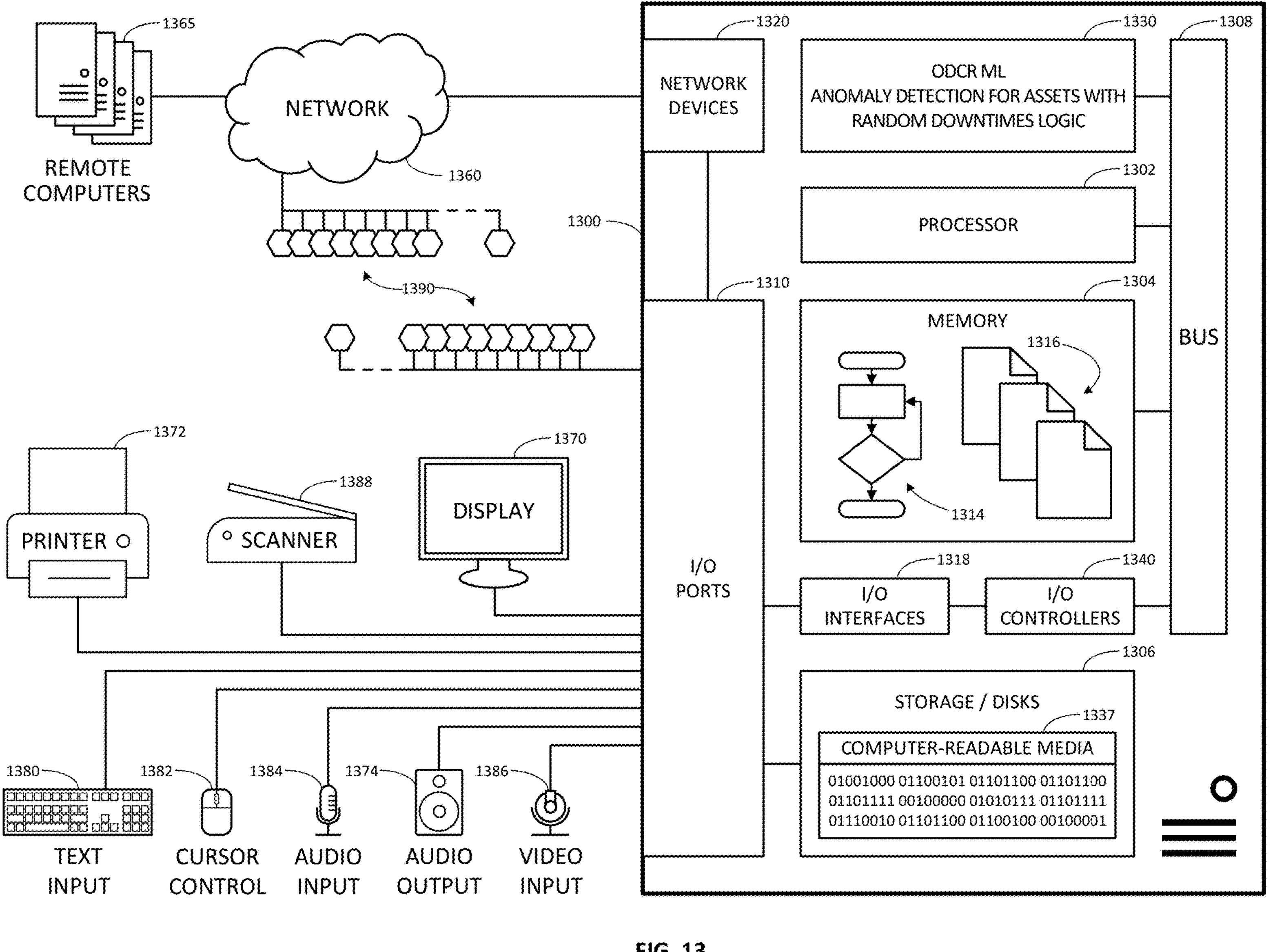
FIG. 13 illustrates an embodiment of a computing system configured with the example systems and/or methods disclosed.

FIG. 13 illustrates an example computing device that is configured and/or programmed as a special purpose computing device with one or more of the example systems and methods described herein, and/or equivalents. The example computing device may be a computer 1300 that includes a processor 1302, a memory 1304, and input/output ports 1310 operably connected by a bus 1308. In one example, the computer 1300 may include OCDR ML anomaly detection for assets with random downtimes logic 1330 configured to facilitate off-duty-cycle-robust machine learning for anomaly detection in assets with random downtimes similar to the logic, systems, and methods shown and described with reference to FIGS. 1 and 5-12. In different examples, the logic 1330 may be implemented in hardware, a non-transitory computer-readable medium with stored instructions 1337, firmware, and/or combinations thereof. While the logic 1330 is illustrated as a hardware component attached to the bus 1308, it is to be appreciated that in other embodiments, the logic 1330 could be implemented in the processor 1302, stored in memory 1304, or stored in disk 1306.

In one embodiment, logic 1330 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to provide off-duty-cycle-robust machine learning for anomaly detection in assets with random downtimes. The means may also be implemented as stored computer executable instructions that are presented to computer 1300 as data 1316 that are temporarily stored in memory 1304 and then executed by processor 1302.

Logic 1330 may also provide means (e.g., hardware, non-transitory computer-readable medium that stores executable instructions, firmware) for performing off-duty-cycle-robust machine learning for anomaly detection in assets with random downtimes.

Generally describing an example configuration of the computer 1300, the processor 1302 may be a variety of various processors including dual microprocessor and other multi-processor architectures. A memory 1304 may include volatile memory and/or non-volatile memory. Non-volatile memory may include, for example, ROM, PROM, and so on. Volatile memory may include, for example, RAM, SRAM, DRAM, and so on.

A storage disk 1306 may be operably connected to the computer 1300 through, for example, an input/output (I/O) interface (e.g., card, device) 1318 and an input/output port 1310 that are controlled by at least an input/output (I/O) controller 1340. The disk 1306 may be, for example, a magnetic disk drive, a solid state disk drive, a floppy disk drive, a tape drive, a Zip drive, a flash memory card, a memory stick, and so on. Furthermore, the disk 1306 may be a CD-ROM drive, a CD-R drive, a CD-RW drive, a DVD ROM, and so on. The memory 1304 can store a process 1314 and/or a data 1316, for example. The disk 1306 and/or the memory 1304 can store an operating system that controls and allocates resources of the computer 1300.

The computer 1300 may interact with, control, and/or be controlled by input/output (I/O) devices via the input/output (I/O) controller 1340, the I/O interfaces 1318 and the input/output ports 1310. The input/output devices include one or more displays 1370, printers 1372 (such as inkjet, laser, or 3D printers), and audio output devices 1374 (such as speakers or headphones), text input devices 1380 (such as keyboards), a pointing and selection device 1382 (such as mice, trackballs, touchpads, touch screens, joysticks, pointing sticks, stylus mice), audio input devices 1384 (such as microphones), video input devices 1386 (such as video and still cameras), video cards (not shown), disk 1335, network devices 1320, sensors 1390, and so on. The input/output ports 1310 may include, for example, serial ports, parallel ports, and USB ports.

The computer 1300 can operate in a network environment and thus may be connected to the network devices 1320 via the I/O interfaces 1318, and/or the I/O ports 1310. Through the network devices 1320, the computer 1300 may interact with a network 1360. Through the network 1360, the computer 1300 may be logically connected to remote computers 1365 and sensors 1390. Networks with which the computer 1300 may interact include, but are not limited to, a LAN, a WAN, and other networks. In one embodiment, the computer 1300 may be connected to sensors 1390 through I/O ports 1310 or networks 1360 in order to receive sensed information from and/or control sensors 1390.

Software Module Embodiments

In general, software instructions are designed to be executed by one or more suitably programmed processor accessing memory. These software instructions may include, for example, computer-executable code and source code that may be compiled into computer-executable code. These software instructions may also include instructions written in an interpreted programming language, such as a scripting language.

In a complex system, such instructions may be arranged into program modules with each such module performing a specific task, process, function, or operation. The entire set of modules may be controlled or coordinated in their operation by an operating system (OS) or other form of organizational platform.

In one embodiment, one or more of the components described herein are configured as modules stored in a non-transitory computer readable medium. The modules are configured with stored software instructions that when executed by at least a processor accessing memory or storage cause the computing device to perform the corresponding function(s) as described herein.

Cloud or Enterprise Embodiments

In one embodiment, the present system (time series data service 105) is a computing/data processing system including an application or collection of distributed applications for enterprise organizations. The applications and computing system may be configured to operate with or be implemented as a cloud-based network computing system, an infrastructure-as-a-service (IAAS), platform-as-a-service (PAAS), or software-as-a-service (SAAS) architecture, or other type of networked computing solution. In one embodiment the present system is a centralized server-side application that provides at least one or more of the functions disclosed herein and a graphical user interface to access and operate them, and that is accessed by many users via computing devices/terminals communicating with the present computing system (functioning as the server) over a computer network.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

API: application programming interface.
ASIC: application specific integrated circuit.
CCGT: combined-cycle gas turbine.
CD: compact disk.
CD-R: CD recordable.
CD-RW: CD rewriteable.
DVD: digital versatile disk and/or digital video disk.
FAP: false-alarm probability.
GPS: global positioning system.
HTTP: hypertext transfer protocol.
IAAS: infrastructure-as-a-service.
IT: information technology.
IoT: Internet of things.
JSON: JavaScript object notation.
LAN: local area network.
MAP: missed-alarm probability.
ML: Machine Learning.
MSET: Multivariate State Estimation Technique.
NN: Neural Network.
NAS: Network Attached Storage.
OCDR: Off-Duty-Cycle-Robust.
PAAS: platform-as-a-service.
RAM: random access memory.
DRAM: dynamic RAM.
SRAM: synchronous RAM.
REST: Representational state transfer.
ROM: read only memory.
PROM: programmable ROM.
EPROM: erasable PROM.
EEPROM: electrically erasable PROM.
RTU: remote terminal unit.
SAAS: software-as-a-service.
SOAP: simple object access protocol.
SPRT: sequential probability ratio test.
SQL: structured query language.
SVM: support vector machine.
TCP/IP: transmission control protocol/Internet protocol
USB: universal serial bus.
XML: extensible markup language.
WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer-implemented method comprising:

receiving a transmission of an electronic time series signal of readings by one or more sensors configured to sense one or more physical phenomena occurring in or around an asset;

inferring ranges of asset downtime from the time series signal for the asset;

extracting an asset downtime signal from the time series signal based on the inferred ranges of asset downtime;

determining that the asset downtime signal carries telemetry based on noise in the asset downtime signal;

training a first machine learning model for the asset downtime signal using segments of the extracted asset downtime signal that were determined to carry telemetry, wherein the trained first machine learning model is configured to detect anomalous activity during asset downtime and configured to automatically replace, during periods of asset downtime surveillance of the time series signal performed by a second machine learning model;

detecting, in real time, an indication in the time series signal of a transition to asset downtime; and in response to detecting the indication, automatically switching from surveillance of the time series signal using the second machine learning model to surveillance of the time series signal for anomalous activity using the trained first machine learning model.

2. The computer-implemented method of claim 1, further comprising:

inferring ranges of asset uptime from the time series signal for the asset;

extracting an asset uptime signal from the time series signal based on the inferred ranges of asset uptime;

training the second machine learning model for the asset uptime signal;

detecting, in the time series signal, a second indication of a transition to asset uptime; and in response to detection of the second indication, automatically switching back to monitoring the time series signal for anomalous activity with the trained second machine learning model.

3. The computer-implemented method of claim 1, further comprising:

in response to determining that the asset downtime signal carries telemetry, determining that the asset downtime signal is stationary stochastic background activity;

analyzing the asset downtime signal to detect anomalies using a sequential probability ratio test; and in response to detection of anomalous dynamic background activity, monitoring the time series signal with the trained first machine learning model, wherein the trained first machine learning model is trained with normal dynamic background activity.

4. The computer-implemented method of claim 1, further comprising:

in response to determining that the asset downtime signal carries telemetry, determining that the asset downtime signal is dynamic background activity; and monitoring the time series signal with the trained first machine learning model, wherein the trained first machine learning model is trained with normal dynamic background activity.

5. The computer-implemented method of claim 1, further comprising:

in response to determining that the asset downtime signal carries telemetry, determining that the asset downtime signal is dynamic background activity that transitions to stationary stochastic background activity;

monitoring the time series signal with the trained first machine learning model until the time series signal transitions from dynamic background activity to stationary stochastic background activity, wherein the trained first machine learning model is trained with normal dynamic background activity;

in response to the transition to the stationary stochastic background activity, monitoring the time series signal using a sequential probability ratio test to detect anomalies; and in response to detection of an anomalous dynamic background activity in the stationary stochastic background activity, resume monitoring the time series signal with the trained first machine learning model.

6. The computer-implemented method of claim 1, wherein onset of asset downtime is inferred based on negative spikes and initiation of asset uptime is inferred based on positive spikes.

7. The computer-implemented method of claim 1, wherein onset of asset downtime is inferred based on positive spikes and initiation of asset uptime is inferred based on negative spikes.

8. The computer-implemented method of claim 1, wherein the first machine learning model is a Multivariate State Estimation Technique model.

9. A non-transitory computer-readable medium that includes stored thereon computer-executable instructions that when executed by at least a processor of a computer cause the computer to:

receive a transmission of an electronic time series signal of readings by one or more sensors configured to sense one or more physical phenomena occurring in or around an asset;

infer ranges of asset downtime from the time series signal for the asset;

extract an asset downtime signal from the time series signal based on the inferred ranges of asset downtime;

determine that the asset downtime signal carries telemetry based on a variance of the asset downtime signal;

train a first machine learning model for the asset downtime signal using segments of the extracted asset downtime signal that were determined to carry telemetry, wherein the trained first machine learning model is configured to detect anomalous activity during asset downtime and configured to automatically replace surveillance of the time series signal performed by a second machine learning model during periods of asset downtime;

detect an indication in the time series signal of a transition to asset downtime; and in response to the indication being detected, automatically switch from surveillance of the time series signal using the second machine learning model to surveillance of the time series signal for anomalous activity using the trained first machine learning model.

10. The non-transitory computer-readable medium of claim 9, wherein the computer-executable instructions when executed further cause the computer to:

infer ranges of asset uptime from the time series signal for the asset;

extract an asset uptime signal from the time series signal based on the inferred ranges of asset uptime;

train the second machine learning model for the asset uptime signal;

detect, in the time series signal, a second indication of a transition to asset uptime; and in response to detection of the second indication, automatically switch back to monitoring the time series signal for anomalous activity with the trained second machine learning model.

11. The non-transitory computer-readable medium of claim 9, wherein the computer-executable instructions when executed further cause the computer to:

in response to determining that the asset downtime signal carries telemetry, determine that the asset downtime signal is stationary stochastic background activity;

analyze the asset downtime signal to detect anomalies using a sequential probability ratio test; and in response to detection of anomalous dynamic background activity, monitor the time series signal with the trained first machine learning model, wherein the trained first machine learning model is trained with normal dynamic background activity.

12. The non-transitory computer-readable medium of claim 9, wherein the computer-executable instructions when executed further cause the computer to:

in response to determining that the asset downtime signal carries telemetry, determine that the asset downtime signal is dynamic background activity; and monitor the time series signal with the trained first machine learning model, wherein the trained first machine learning model is trained with the dynamic background activity.

13. The non-transitory computer-readable medium of claim 9, wherein the computer-executable instructions when executed further cause the computer to:

in response to determining that the asset downtime signal carries telemetry, determine that the asset downtime signal is dynamic background activity that transitions to stationary stochastic background activity;

monitor the time series signal with the trained first machine learning model until the time series signal transitions from dynamic background activity to stationary stochastic background activity, wherein the trained first machine learning model is trained with normal dynamic background activity;

in response to the transition to the stationary stochastic background activity, monitor the time series signal using a sequential probability ratio test to detect anomalies; and in response to detection of an anomalous dynamic background activity in the stationary stochastic background activity, resume monitoring the time series signal with the trained first machine learning model.

14. The non-transitory computer-readable medium of claim 9, wherein onset of asset downtime is inferred based on spikes of a first direction and initiation of asset operational time is inferred based on spikes of a second direction opposite the first direction.

15. The non-transitory computer-readable medium of claim 9, wherein the first machine learning model is a Multivariate State Estimation Technique model.

16. A computing system comprising:

a processor;

a memory operably connected to the processor;

one or more sensors operably connected to the processor and memory and configured to sense one or more physical phenomena occurring in or around an asset;

a non-transitory computer-readable medium operably connected to the processor and memory and storing computer-executable instructions that when executed by at least the processor of the computing system cause the computing system to:

receive a transmission of an electronic time series signal of readings by the one or more sensors;

infer ranges of asset downtime from the time series signal for the asset;

extract an asset downtime signal from the time series signal based on the inferred ranges of asset downtime;

determine that the asset downtime signal carries telemetry based on a variance of the asset downtime signal;

train a first machine learning model for the asset downtime signal using segments of the extracted asset downtime signal that were determined to carry telemetry, wherein the trained first machine learning model is configured to detect anomalous activity during asset downtime and configured to automatically replace, during periods of asset downtime surveillance of the time series signal performed by a second machine learning model;

detect an indication in the time series signal of a transition to asset downtime; and in response to the indication being detected, automatically switch from surveillance of the time series signal using the second machine learning model to surveillance of the time series signal for anomalous activity using the trained first machine learning model.

17. The computing system of claim 16, wherein the instructions further cause the computing system to:

infer ranges of asset uptime from the time series signal for the asset;

extract an asset uptime signal from the time series signal based on the inferred ranges of asset uptime;

train the second machine learning model for the asset uptime signal;

detect, in the time series signal, a second indication of a transition to asset uptime; and in response to detection of the second indication, automatically switch back to monitoring the time series signal for anomalous activity with the trained second machine learning model.

18. The computing system of claim 16, wherein the instructions further cause the computing system to:

in response to determining that the asset downtime signal carries telemetry, determine that the asset downtime signal is dynamic background activity that transitions to stationary stochastic background activity;

monitor the time series signal with the trained first machine learning model until the time series signal transitions from dynamic background activity to stationary stochastic background activity, wherein the trained first machine learning model is trained with normal dynamic background activity;

in response to the transition to the stationary stochastic background activity, monitor the time series signal using a sequential probability ratio test to detect anomalies; and in response to detection of an anomalous dynamic background activity in the stationary stochastic background activity, resume monitoring the time series signal with the trained first machine learning model.

19. The computing system of claim 16, wherein the instructions further cause the computing system to, in response to detecting anomalous activity in the asset downtime signal, automatically adjust operation of the asset.

20. The computing system of claim 16, wherein the instructions further cause the computing system to automatically select the time series signal for the asset from among other time series signals for the asset.

* * * * *